US008963955B2

(12) United States Patent
Noge

(10) Patent No.: US 8,963,955 B2
(45) Date of Patent: Feb. 24, 2015

(54) INFORMATION PROCESSING PROGRAM, INFORMATION PROCESSING APPARATUS, INFORMATION PROCESSING SYSTEM, AND INFORMATION PROCESSING METHOD

(75) Inventor: Tetsuya Noge, Yamanashi (JP)

(73) Assignees: Nintendo Co., Ltd., Kyoto (JP); Hal Laboratory Inc., Tokyo (JP)

( * ) Notice: Subject to any disclaimer, the term of this patent is extended or adjusted under 35 U.S.C. 154(b) by 1052 days.

(21) Appl. No.: 12/984,904

(22) Filed: Jan. 5, 2011

(65) Prior Publication Data
US 2011/0304647 A1 Dec. 15, 2011

(30) Foreign Application Priority Data

Jun. 15, 2010 (JP) ................................. 2010-136417

(51) Int. Cl.
G09G 5/00 (2006.01)
G06T 19/00 (2011.01)
(52) U.S. Cl.
CPC .............. G06T 19/00 (2013.01); G06T 19/006 (2013.01)
USPC ........... 345/633; 345/611; 345/646; 345/649; 345/672
(58) Field of Classification Search
USPC ...................................................... 345/633
See application file for complete search history.

(56) References Cited

U.S. PATENT DOCUMENTS

2002/0084974 A1 7/2002 Ohshima et al.
2009/0109240 A1* 4/2009 Englert et al. ................ 345/633
2010/0045701 A1* 2/2010 Scott et al. .................... 345/633

FOREIGN PATENT DOCUMENTS

JP 2003-308514 10/2003

OTHER PUBLICATIONS

Kato, H. et al., "Marker Tracking and HMD Calibration for a Video-based Augmented Reality Conferencing System", Proceedings of the $2^{nd}$ IEEE and ACM International Workshop on Augmented Reality, (Oct. 20-21, 1999), pp. 85-94.
Jul. 24, 2012, Notice of Reasons for Rejection for JP 2010-136417, 1 page.

* cited by examiner

Primary Examiner — Phi Hoang
(74) Attorney, Agent, or Firm — Nixon & Vanderhye P.C.

(57) ABSTRACT

An information processing section of a game apparatus executes a program which includes: acquiring a real world image; setting the most recent view matrix of a virtual camera based on a detected marker S204; reading the previous view matrix S206; calculating correction view matrixes so as to change a blending ratio at which the most recent view matrix is blended depending on a distance S208 to S210; selecting the correction view matrix such that the longer the distance between an object and the marker is, the lower the blending ratio is; and rendering a virtual object in a frame buffer in a superimposed manner by using the selected correction view matrix.

17 Claims, 16 Drawing Sheets

INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-136417, filed on Jun. 15, 2010, is incorporated herein by reference.

BACKGROUND AND SUMMARY

1. Technical Field

The technology presented herein relates to an information processing technique for superimposing a virtual object image on a real space to perform a display, and more particularly to an information processing technique for correcting a deviation, in display position of a virtual object, which is caused due to an error in detection of a marker in a photographed image, and for performing a corrected display.

2. Description of the Background Art

A so-called augmented reality system is realized which displays an image in which a virtual object image is superimposed on a real world (a real space or a real environment) as if an object exists in a virtual space. The augmented reality system provides a technique for displaying a virtual object in a real world, without causing unnaturalness, by, for example, superimposing a previously generated image of the virtual object on a real space photographed by a camera. Non-patent Document 1 (Hirokazu Kato and Mark Billinghurst, "Marker Tracking and HMD Calibration for a Video-based Augmented Reality Conferencing System", 1999) discloses a technique, associated with such an augmented reality system, for detecting a marker in an image photographed by a camera, and for displaying a virtual object at a position corresponding to the marker based on the information of the detected marker.

When the marker is detected based on an image photographed by a camera, an accuracy for detecting the maker may not be stabilized depending on, for example, a degree to which the marker is illuminated, thereby causing an error in marker detection. When the marker detection result including such an error is used, a position at which a virtual object image is to be displayed may be deviated. However, such a problem cannot be solved by the technique disclosed in Non-patent Document 1. Therefore, it is impossible to realize a natural augmented reality effect that a display is made as if a virtual object exists in a real world.

SUMMARY

Therefore, a feature of the present technology is to provide an information processing technique in which a natural augmented reality effect can be realized by preventing a deviation of a position at which a virtual object is displayed, to perform a display.

The present technology has the following features to attain the object mentioned above.

An information processing program according to a first aspect of the present technology causes a computer of an information processing apparatus connected to imaging means and display means which displays a real space on a screen in a visible manner to function as: photographed image data acquisition means; detection means; calculation means; virtual camera setting means; virtual camera determination means; object image generation means; and display control means. The photographed image data acquisition means sequentially acquires photographed image data representing a photographed image which is photographed by the imaging means. The detection means detects a specific target in the photographed image represented by the photographed image data which has been sequentially acquired by the photographed image data acquisition means. The calculation means calculates a relative positional relationship between the imaging means and the specific target detected by the detection means. The virtual camera setting means sets a position and an orientation of a virtual camera in a virtual space, based on the positional relationship. The virtual camera determination means determines a latest position and a latest orientation of the virtual camera, based on a position and an orientation of the virtual camera which have been most recently set by the virtual camera setting means, and a position and an orientation of the virtual camera which have been set by the virtual camera setting means at a previous time. The object image generation means generates an object image of a virtual object in the virtual space, based on the latest position and the latest orientation of the virtual camera which have been determined by the virtual camera determination means. The display control means superimposes the object image generated by the object image generation means, on the real space on the screen of the display means, to perform a display.

In these features, a virtual object image is superimposed on an image representing the real space, to perform a display by the display means. The virtual camera setting means sets the position and the orientation (for example, the position and the orientation of the virtual camera based on a view matrix of the virtual camera) of the virtual camera in the virtual space, based on a relative positional relationship between the imaging means and the specific target. In this case, even when an error in detection of the specific target occurs (this error usually occurs) depending on, for example, a state in which the specific target included in the sequentially photographed image is illuminated, the virtual camera determination means determines the latest position and the latest orientation of the virtual camera based on the position and the orientation of the virtual camera having been most recently set and the position and the orientation of the virtual camera having been set at the previous time. At this time, for example, the latest position and the latest orientation of the virtual camera are determined by blending the position and the orientation of the virtual camera having been most recently set, and the position and the orientation of the virtual camera having been set at the previous time. When the ratio at which the position and the orientation having been most recently set are blended is increased, the influence of the position and the orientation having been set at the previous time is reduced. On the other hand, when the ratio at which the position and the orientation having been set at the previous time are blended is increased, the influence of the position and the orientation having been set at the previous time is increased. In these manners, the latest position and the latest orientation of the virtual camera can be determined, and images of the virtual objects are taken by the virtual camera. Since the images of the virtual objects are taken by the virtual camera for which the latest position and the latest orientation have been thus determined, and displayed, the deviation in display positions of the virtual objects can be suppressed. As a result, the virtual objects are displayed at appropriate positions as if the virtual objects exist in the real world, thereby realizing a natural augmented reality effect.

Preferably, the virtual camera determination means can determine the latest position and the latest orientation of the virtual camera, based on a distance between the specific target and the virtual object.

The deviation in display position of the virtual object depends on a distance between the specific target and the virtual object. Therefore, in these features, the latest position and the latest orientation of the virtual camera are determined based on a distance between the specific target and the virtual object, thereby enabling appropriate display of the virtual object.

Preferably, the virtual camera determination means can determine the latest position and the latest orientation of the virtual camera such that, when the distance is long, a degree to which the position and the orientation of the virtual camera having been set at the previous time are used is greater than when the distance is short.

The deviation in display position of the virtual object occurs due to an angular error (inclination), and the longer the distance between the specific target and the virtual object is, the greater the deviation in display position of the virtual object is. Therefore, the deviation is increased when a distance between the specific target and the virtual object is longer, as compared to when a distance between the specific target and the virtual object is shorter. Thus, the deviation in the display position of the virtual object which is separated from the specific target by a long distance is great. Therefore, the latest position and the latest orientation of the virtual camera are determined by increasing a blending ratio of the position and the orientation of the virtual camera having been set at the previous time. As a result, the virtual object can be appropriately displayed.

Preferably, the object image generation means can generate the object image, based on the position and the orientation of the virtual camera having been most recently set by the virtual camera setting means, when the distance between the specific target and the virtual object is less than a predetermined distance.

When a distance between the specific target and the virtual object is short, the deviation in display position of the virtual object is small. In this case, the position and the orientation of the virtual camera having been most recently set are used without using the position and the orientation of the virtual camera having been set at the previous time. Therefore, the calculation can be reduced because the position and the orientation of the virtual camera having been set at the previous time need not be taken into consideration.

Preferably, the virtual camera determination means can determine the latest position and the latest orientation of the virtual camera, based on the position and the orientation of the virtual camera having been most recently set by the virtual camera setting means, and the position and the orientation of the virtual camera having been set by the virtual camera setting means at the previous time, when the virtual object is a moving object.

In these features, when the virtual object is movable (including when the virtual object is floating), even if an image of the virtual object is taken by the virtual camera for which the latest position and the latest orientation have been determined by increasing the blending ratio of the position and the orientation of the virtual camera having been set at the previous time, and the taken image is displayed, the virtual object, which is moving, does not make a user feel unnatural. Therefore, the moving object can be appropriately displayed.

Preferably, the virtual camera determination means can determine, as the latest position and the latest orientation of the virtual camera, a position and an orientation which are obtained by correcting the position and the orientation of the virtual camera having been set at the previous time so as to approach, at a predetermined ratio, the position and the orientation of the virtual camera having been most recently set.

In these features, the position and the orientation of the virtual camera having been set at the previous time can approach, at a predetermined ratio, the position and the orientation of the virtual camera having been most recently set, to determine the latest position and the latest orientation of the virtual camera. If a great error is included in a result of the most recent detection of the specific target, the most recent position and the most recent orientation of the virtual camera are influenced by the great error. However, also in this case, the position and the orientation of the virtual camera only approach, at the predetermined ratio, the position and the orientation having been most recently set, thereby suppressing great deviation in display position of the virtual object.

Preferably, the predetermined ratio can be less than or equal to a predetermined value.

In these features, even when the position and the orientation of the virtual camera having been most recently set are obtained so as to include a great error, the position and the orientation of the virtual camera only approach, at a predetermined ratio or less, the position and the orientation having been most recently set. Therefore, it is possible to suppress great deviation in display position of the virtual object.

Preferably, the virtual camera determination means can determine the latest position and the latest orientation of the virtual camera, by blending, at a predetermined ratio, the position and the orientation of the virtual camera having been set at the previous time, and the position and the orientation of the virtual camera having been most recently set.

In these features, the position and the orientation of the virtual camera having been most recently set and the position and the orientation of the virtual camera having been set at the previous time can be blended at a predetermined ratio, to determine the latest position and the latest orientation of the virtual camera. The position and the orientation of the virtual camera can be determined by changing the predetermined ratio, thereby appropriately displaying the virtual object.

Preferably, the program can cause the computer to further function as holding means for holding a plurality of groups each containing the position and the orientation of the virtual camera having been determined by the virtual camera determination means such that the predetermined ratio is different for each group. In this case, the object image generation means can generate the object image based on a selected one of the plurality of groups each containing the position and the orientation of the virtual camera.

In these features, a plurality of groups each containing the position and the orientation of the virtual camera are held such that the predetermined ratio is different for each group. For example, based on a distance between the specific target and the virtual object, one of the plurality of groups each containing the position and the orientation of the virtual camera is selected. Thus, the position and the orientation of the virtual camera having been held in advance are used to appropriately display the virtual object.

Preferably, the virtual camera determination means can determine the latest position and the latest orientation of the virtual camera so as to satisfy a change allowable value of the position of the virtual camera and a change allowable value of the orientation of the virtual camera.

In these features, the process is performed so as to satisfy the change allowable value of the position of the virtual camera, and the change allowable value of the orientation of the virtual camera. Therefore, the position and the orientation of the virtual camera having been set at the previous time are not greatly different from the position and the orientation of the virtual camera having been determined at the previous time. Thus, even when a great error occurs in the position and the orientation of the virtual camera having been most recently set, the latest position and the latest orientation of the virtual camera, which do not greatly change from the position and the orientation having been determined at the previous time, can be used to appropriately display the virtual object.

Preferably, the position and the orientation of the virtual camera can be represented by a view matrix.

In these features, the virtual object can be appropriately displayed by using the position and the orientation of the virtual camera represented by the view matrix.

Preferably, the program can cause the computer to further function as positioning means for positioning a plurality of the virtual objects in the virtual space. In this case, the virtual camera determination means can determine the latest position and the latest orientation of the virtual camera for each virtual object.

In these features, when a plurality of the virtual objects are displayed, the latest position and the latest orientation of the virtual camera are determined based on the characteristic (for example, a distance between the specific target and the virtual object) of each virtual object, thereby appropriately displaying the virtual objects.

An information processing apparatus according to a second aspect of the present technology includes: imaging means for taking an image as a photographed image; display means for displaying a real space on a screen in a visible manner; photographed image data acquisition means for sequentially acquiring photographed image data representing the photographed image which is photographed by the imaging means; detection means for detecting a specific target in the photographed image represented by the photographed image data which has been sequentially acquired by the photographed image data acquisition means; calculation means for calculating a relative positional relationship between the imaging means and the specific target detected by the detection means; virtual camera setting means for setting a position and an orientation of a virtual camera in a virtual space, based on the positional relationship; virtual camera determination means for determining a latest position and a latest orientation of the virtual camera, based on a position and an orientation of the virtual camera which have been most recently set by the virtual camera setting means, and a position and an orientation of the virtual camera which have been set by the virtual camera setting means at a previous time; object image generation means for generating an object image of a virtual object in the virtual space, based on the latest position and the latest orientation of the virtual camera which have been determined by the virtual camera determination means; and display control means for superimposing the object image generated by the object image generation means, on the real space on the screen of the display means, to perform a display.

An information processing system according to a third aspect of the present technology includes: imaging means for taking an image as a photographed image; display means for displaying a real space on a screen in a visible manner; photographed image data acquisition means for sequentially acquiring photographed image data representing the photographed image which is photographed by the imaging means; detection means for detecting a specific target in the photographed image represented by the photographed image data which has been sequentially acquired by the photographed image data acquisition means; calculation means for calculating a relative positional relationship between the imaging means and the specific target detected by the detection means; virtual camera setting means for setting a position and an orientation of a virtual camera in a virtual space, based on the positional relationship; virtual camera determination means for determining a latest position and a latest orientation of the virtual camera, based on a position and an orientation of the virtual camera which have been most recently set by the virtual camera setting means, and a position and an orientation of the virtual camera which have been set by the virtual camera setting means at a previous time; object image generation means for generating an object image of a virtual object in the virtual space, based on the latest position and the latest orientation of the virtual camera which have been determined by the virtual camera determination means; and display control means for superimposing the object image generated by the object image generation means, on the real space on the screen of the display means, to perform a display.

An information processing method according to a fourth aspect of the present technology includes: imaging step of taking an image as a photographed image by imaging means; display step of displaying a real space on a screen of display means in a visible manner; photographed image data acquisition step of sequentially acquiring photographed image data representing the photographed image which is photographed by the imaging means; detection step of detecting a specific target in the photographed image represented by the photographed image data which has been sequentially acquired by the photographed image data acquisition step; calculation step of calculating a relative positional relationship between the imaging means and the specific target detected by the detection step; virtual camera setting step of setting a position and an orientation of a virtual camera in a virtual space, based on the positional relationship; virtual camera determination step of determining a latest position and a latest orientation of the virtual camera, based on a position and an orientation of the virtual camera which have been most recently set by the virtual camera setting step, and a position and an orientation of the virtual camera which have been set by the virtual camera setting step at a previous time; object image generation step of generating an object image of a virtual object in the virtual space, based on the latest position and the latest orientation of the virtual camera which have been determined by the virtual camera determination step; and display control step of superimposing the object image generated by the object image generation step, on the real space on the screen of the display means, to perform a display.

The information processing apparatus according to the second aspect of the present technology, the information processing system according to the third aspect of the present invention, and the information processing method according to the fourth aspect of the present invention exhibit the same function and effect as the information processing program according to the first aspect of the present invention.

A program according to a fifth aspect of the present technology causes a computer, of an information processing apparatus connected to imaging means and display means which displays a real space on a screen in a visible manner, to function as: photographed image data acquisition means; detection means; positional relationship calculation means; virtual camera setting means; display position determination means; virtual object image generation means; and display control means. The photographed image data acquisition means sequentially acquires photographed image data representing a photographed image which is photographed by the imaging means. The detection means detects a specific target in the photographed image represented by the photographed image data which has been sequentially acquired by the photographed image data acquisition means. The positional relationship calculation means calculates a relative positional relationship between the imaging means and the specific target detected by the detection means. The virtual camera setting means sets a position and an orientation of a virtual camera in a virtual space, based on the positional relationship. The display position determination means determines a latest display position of a virtual object, based on a previous display position of the virtual object, and a display position, on an image displayed by the display means, of the virtual object which is obtained by taking an image of the virtual object in the virtual space by the virtual camera having the position and the orientation having been most recently set by the virtual camera setting means. The virtual object image generation means generates a virtual object image of the virtual object so as to display the virtual object at the display position having been determined by the display position determination means. The display control means superimposes the virtual object image generated by the virtual object image generation means, on the real space on the screen of the display means, to perform a display.

In these features, the latest display position of the virtual object is determined by using a previous display position of the virtual object, and a display position, on the screen, which is obtained by taking an image of the virtual object by the virtual camera having the position and the orientation having been most recently set, without using the latest position and the latest orientation of the virtual camera having been determined as described above to display the virtual object at an appropriate position, thereby appropriately displaying the virtual object. As a result, the virtual object is displayed at the appropriate position as if the virtual object exists in the real world, thereby realizing a natural augmented reality effect.

Preferably, the display position determination means can determine a latest position of the virtual object in the virtual space by using a position of the virtual object in the virtual space which is obtained in a most recent process loop, and a position of the virtual object in the virtual space which has been obtained in a process loop preceding the most recent process loop. In this case, the virtual object image generation means can generate the virtual object image by an image of the virtual object located at the latest position in the virtual space being taken by the virtual camera having the position and the orientation having been most recently set.

In these features, the latest position of the virtual object in the virtual space is determined by using the position of the virtual object in the virtual space which is obtained in the most recent process loop, and the position of the virtual object in the virtual space which has been obtained in a process loop preceding the most recent process loop. An image of the virtual object located at the latest position in the virtual space is taken by the virtual camera having the position and the orientation having been most recently set, thereby appropriately displaying the virtual object.

A program according to a sixth aspect of the present technology causes a computer, of an information processing apparatus connected to imaging means and display means which displays a real space on a screen in a visible manner, to function as: photographed image data acquisition means; detection means; calculation means; virtual camera setting means; virtual camera determination means; object image generation means; and display control means. The photographed image data acquisition means sequentially acquires photographed image data representing a photographed image which is photographed by the imaging means. The detection means detects a specific target in the photographed image represented by the photographed image data which has been sequentially acquired by the photographed image data acquisition means. The calculation means calculates a relative positional relationship between the imaging means and the specific target detected by the detection means. The virtual camera setting means sets a position and an orientation of a virtual camera in a virtual space, based on the positional relationship. The virtual camera determination means determines a latest position and a latest orientation of the virtual camera, based on a position and an orientation of the virtual camera having been most recently set by the virtual camera setting means, and a position and an orientation of the virtual camera having been previously used for generating an object image of a virtual object in the virtual space. The object image generation means generates the object image, based on the latest position and the latest orientation of the virtual camera having been determined by the virtual camera determination means. The display control means superimposes the object image generated by the object image generation means, on the real space on the screen of the display means, to perform a display.

In these features, a virtual object image is superimposed on an image representing a real space, to perform a display by the display means. Even when an error in detection of the specific target occurs, the virtual camera determination means determines the latest position and the latest orientation of the virtual camera, based on the position and the orientation of the virtual camera having been most recently set, and the position and the orientation (not the position and the orientation of the virtual camera having been set at the previous time) of the virtual camera which have been previously used for generating the object image of the virtual object in the virtual space. Thus, the latest position and the latest orientation of the virtual camera are determined by using the position and the orientation (by using view matrix which has been previously used for rendering) of the virtual camera which have been previously used for rendering the virtual object, and an image of the virtual object is taken by the virtual camera. An image of the virtual object is taken by the virtual camera having the latest position and the latest orientation thus determined, and the image is displayed, thereby suppressing the deviation in display position of the virtual object. As a result, the virtual object is displayed at an appropriate position as if the virtual object exists in the real world as realized by the information processing program according to the first aspect, thereby realizing a natural augmented reality effect.

According to the present technology, the display is made so as to suppress the deviation in display position of the virtual object, thereby realizing a natural augmented reality effect.

These and other features, aspects and advantages of the present technology will become more apparent from the following detailed description of the present technology when taken in conjunction with the accompanying drawings.

DESCRIPTION OF THE PREFERRED EMBODIMENTS

First Embodiment

Structure of Game Apparatus

Hereinafter, a game apparatus will be described as an information processing apparatus according to a first embodiment of the present technology. The present technology is not limited to such an apparatus. The present technology may be implemented as an information processing program executed by such an apparatus, or as an information processing system associated with such an apparatus. Further, the present technology may be implemented as an information processing method performed by such an apparatus.

Figure 1:
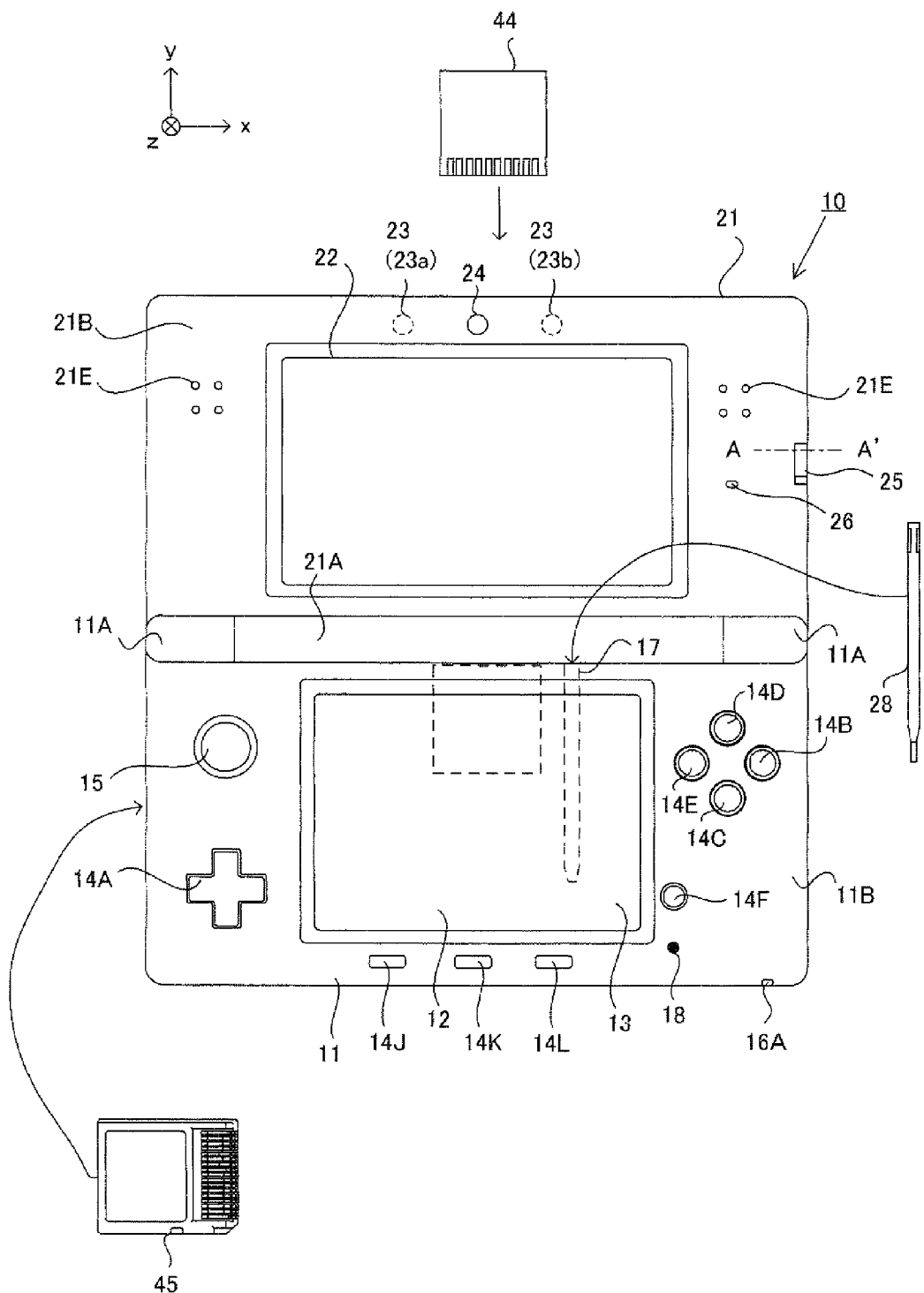
FIG. 1 is a front view of a game apparatus 10 in an opened state.
Figure 2:
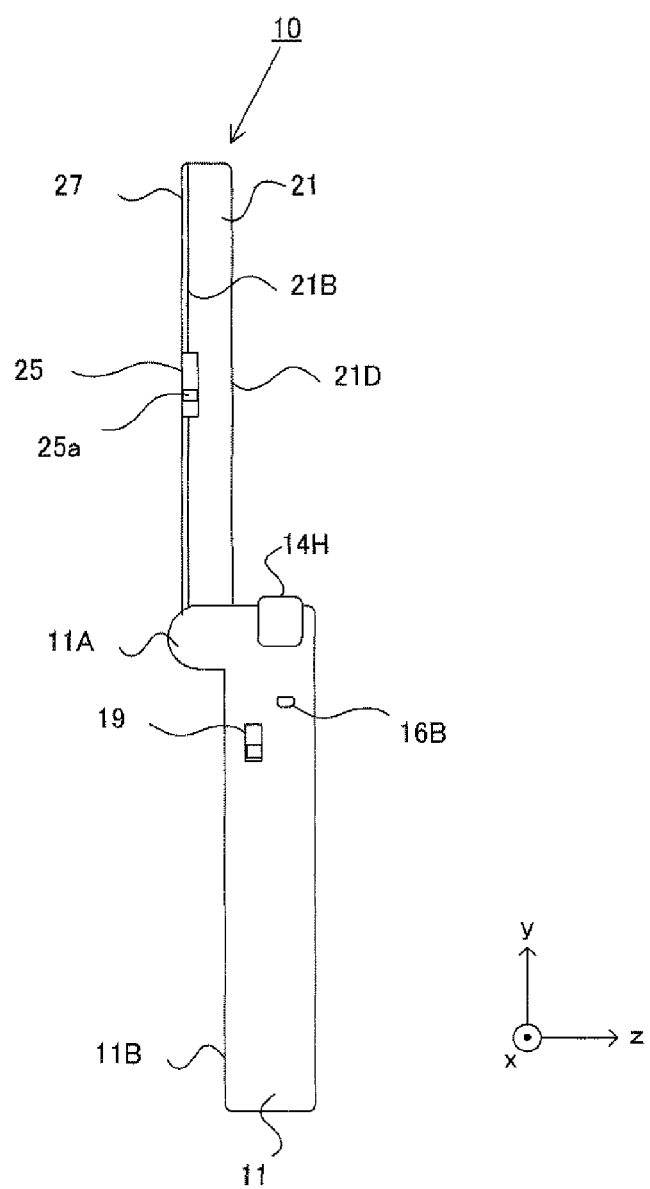
FIG. 2 is a side view of the game apparatus 10 in the opened state.
Figure 3:
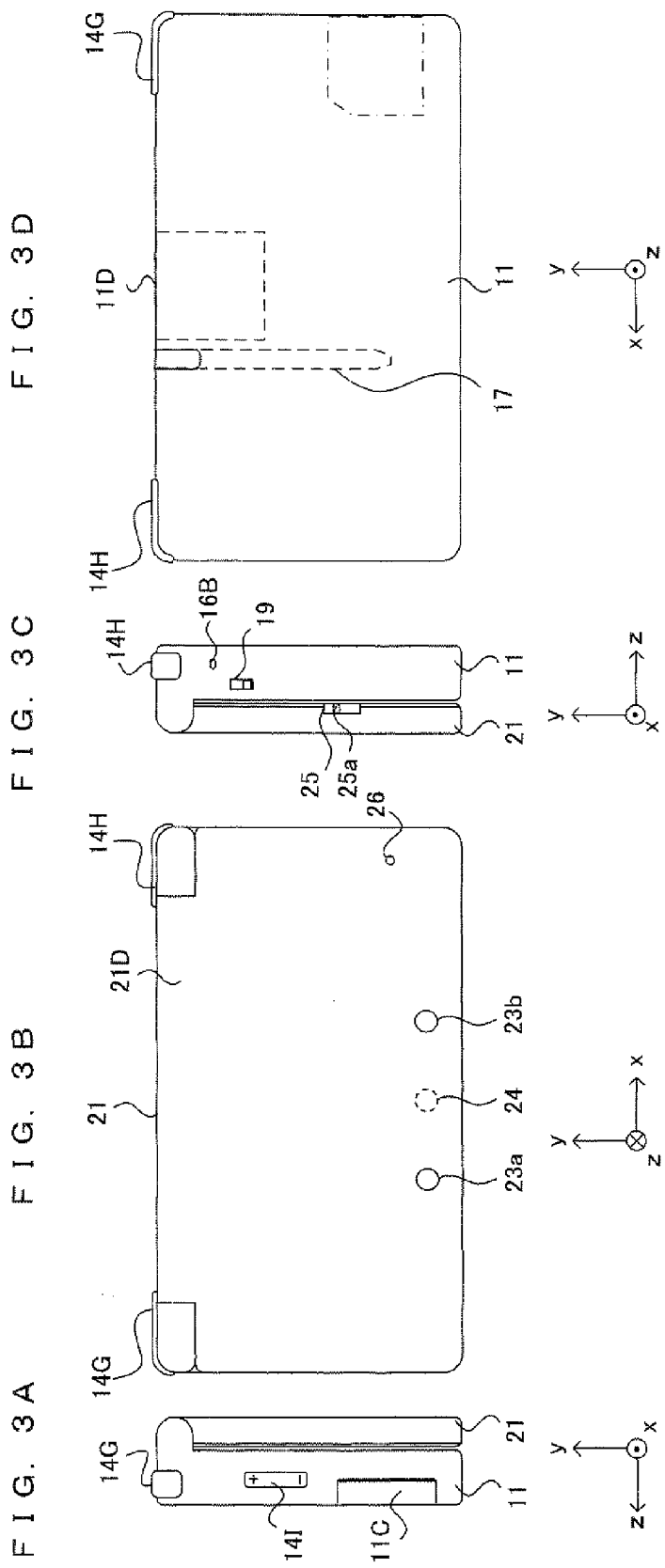
FIG. 3A to 3D are a left side view, a front view, a right side view, and a rear view of the game apparatus 10 in a closed state.

FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closeable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the horizontal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electra Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 are disposed on opposite sides of the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 7) is provided as a sound input device described below, and the microphone detects for a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14I1 act as shutter buttons (imaging instruction buttons) of the imaging section. Further, as shown in FIG. 3A, a sound volume button 14I is provided on the left side surface of the lower housing 11. The sound volume button 14I is used for adjusting a sound volume of a speaker of the game apparatus 10.

As shown in FIG. 3A, a cover section 11C is provided on the left side surface of the lower housing 11 so as to be openable and closeable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

Figure 4:
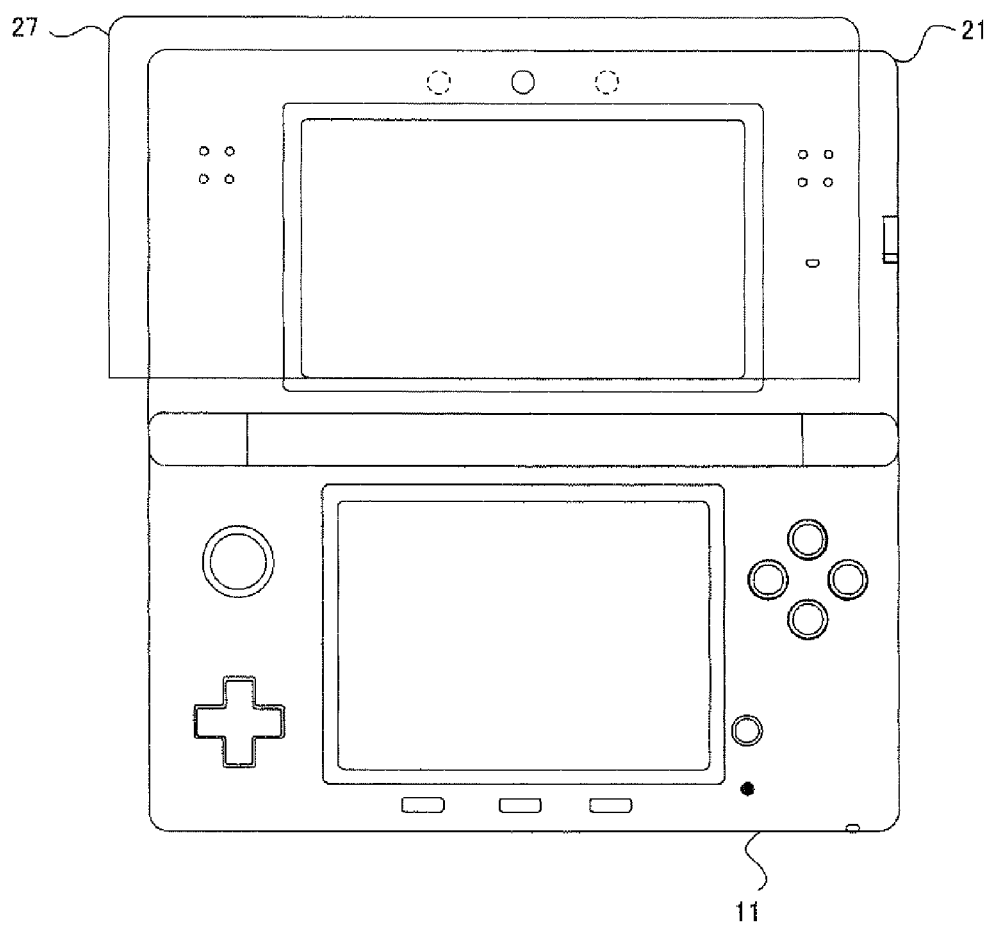
FIG. 4 is a diagram illustrating a state in which a screen cover 27 is removed from an inner side surface of an upper housing 21.

The screen of the upper LCD 22 is provided on the inner side surface (main surface) 21B of the upper housing 21, and the screen of the upper LCD 22 is exposed at an opening of the upper housing 21. Further, as shown in FIG. 2 and FIG. 4, the inner side surface of the upper housing 21 is covered with a transparent screen cover 27. FIG. 4 is an exploded view illustrating a state in which the screen cover 27 is removed from the inner side surface of the upper housing 21. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electra Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example, However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3B, the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3B represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

Figure 5:
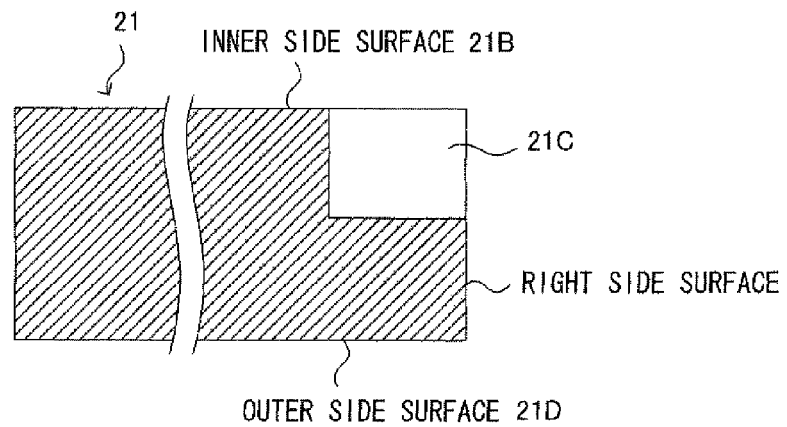
FIG. 5 is a cross-sectional view of the upper housing 21 shown in FIG. 1 taken along a line A-A'.

FIG. 5 is a cross-sectional view of the upper housing 21 shown in FIG. 1 taken along a line A-A'. As shown in FIG. 5, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 is determined in accordance with the position of the slider 25a.

Figure 6A:
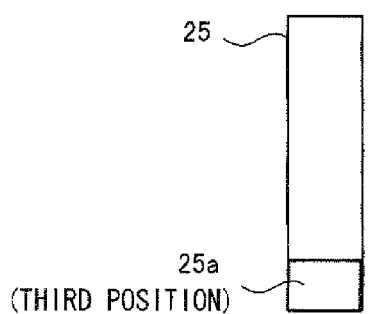
FIG. 6A is a diagram illustrating a state in which a slider 25a of a 3D adjustment switch 25 is positioned at a lowermost position (a third position)
Figure 6B:
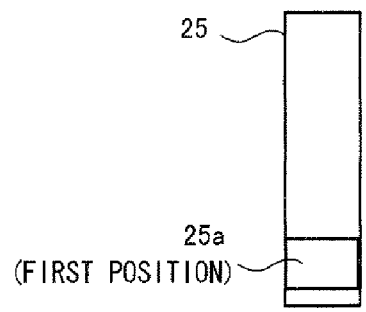
FIG. 6B is a diagram illustrating a state in which the slider 25a of the 3D adjustment switch 25 is positioned above the lowermost position (a first position)
Figure 6C:
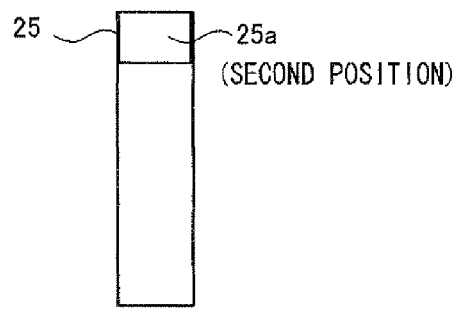
FIG. 6C is a diagram illustrating a state in which the slider 25a of the 3D adjustment switch 25 is positioned at an uppermost position (a second position)

FIG. 6A to FIG. 6C are each a diagram illustrating a state in which the slider 25a of the 3D adjustment switch 25 slides. FIG. 6A is a diagram illustrating a state in which the slider 25a of the 3D adjustment switch 25 is positioned at the lowermost position (a third position). FIG. 6B is a diagram illustrating a state in which the slider 25a of the 3D adjustment switch 25 is positioned above the lowermost position (a first position). FIG. 6C is a diagram illustrating a state in which the slider 25a of the 3D adjustment switch 25 is positioned at the uppermost position (a second position).

As shown in FIG. 6A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25a is positioned between a position shown in FIG. 6B (a position (first position) above the lowermost position) and a position shown in FIG. 6C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a. The slider 25a of the 3D adjustment switch 25 is configured so as to be fixed at the third position, and is slidable, along the longitudinal direction of the right side surface, to any position between the first position and the second position. For example, the slider 25a is fixed at the third position by a projection (not shown) which, projects, from the side surface of the 3D adjustment switch 25, in the lateral direction shown in FIG. 6A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The program executed by the game apparatus according to the present embodiment includes a program for displaying a stereoscopic photograph, and a program for displaying a stereoscopic CG image. The program for displaying a stereoscopic CG image is used for taking an image of a virtual space by means of a virtual camera for a left eye and a virtual camera for a right eye to generate an image for the left eye and an image for the right eye. The game apparatus according to the present embodiment adjusts the stereoscopic effect by changing a distance between the two virtual cameras in accordance with the position of the slider 25a of the 3D adjustment switch 25 when executing such a program.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 7:
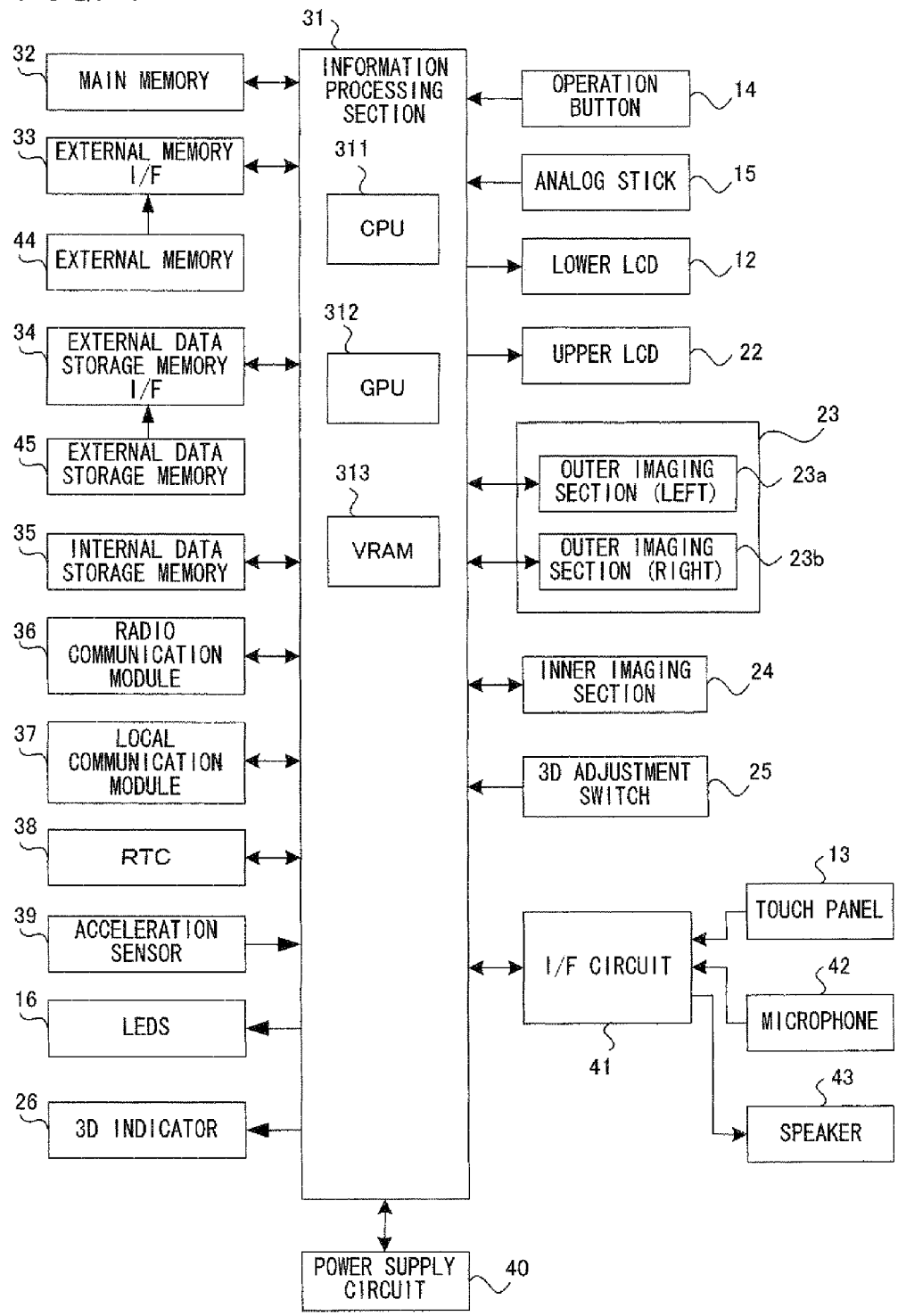
FIG. 7 is a block diagram illustrating an internal configuration of the game apparatus 10.

Next, an internal electrical configuration of the game apparatus 10 will be described with reference to FIG. 7. FIG. 7 is a block diagram illustrating an internal configuration of the game apparatus 10. As shown in FIG. 7, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes a virtual object display process (FIG. 10) described below by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the virtual object display process, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14L is outputted from the operation button 14 to the information processing section 31, and the input state indicates whether or not each of the operation buttons 14A to 14L has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31, are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13. When the information processing section 31 (the CPU 311) detects that the imaging section is selected, the information processing section 31 instructs one of the outer imaging section 23 or the inner imaging section 24 to take an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

(Details of Virtual Object Display Process)

Figure 8:
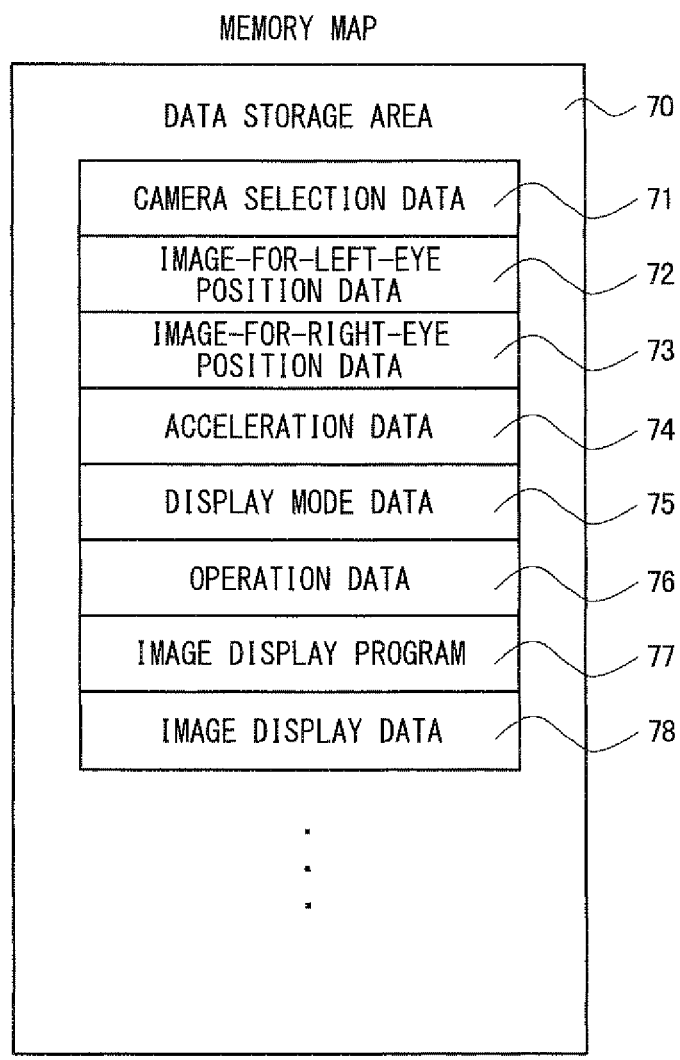
FIG. 8 is a diagram illustrating a memory map of a main memory 32 of the game apparatus 10.

Next, a virtual object display process according to the present embodiment will be described in detail with reference to FIG. 8 to FIG. 12. Initially, main data to be stored in the main memory 32 when the virtual object display process is executed will be described. FIG. 8 is a diagram illustrating a memory map of the main memory 32 of the game apparatus 10. As shown in FIG. 8, the main memory 32 has a data storage area 70. Camera selection data 71, image-for-left-eye position data 72, image-for-right-eye position data 73, acceleration data 74, display mode data 75, operation data 76, an image display program 77, image display data 78, and the like are stored in the data storage area 70. In addition to the data described above, programs for executing the imaging process described above, data representing a touch position on the touch panel 13, data representing an image which is displayed on the lower LCD 12 for selection of a camera, and the like are stored in the main memory 32. In the following description, the "imaging section" may be referred to as a "camera".

The camera selection data 71 represents the imaging section which has been most recently selected. The camera selection data 71 indicates whether the most recently selected imaging section is the outer imaging section 23 or the inner imaging section 24.

The image-for-left-eye position data 72 represents a position at which the image for a left eye which has been taken by the outer imaging section (left) 23a is displayed on the upper LCD 22, and represents a coordinate value of the image center of the image for the left eye. The image-for-right-eye position data 73 represents a position at which the image for a right eye which has been taken by the outer imaging section (right) 23b is displayed on the upper LCD 22, and represents a coordinate value of the image center of the image for the right eye.

The acceleration data 74 represents an acceleration which has been most recently detected by the acceleration sensor 39. Specifically, the acceleration data 74 represents a value of accelerations in the x-axis direction, the y-axis direction, and the z-axis direction, which are detected by the acceleration sensor 39. The acceleration sensor 39 detects an acceleration every predetermined period, and transmits the acceleration to the information processing section 31 (the CPU 311). The information processing section 31 updates the acceleration data 74 in the main memory 32 each time the acceleration sensor 39 detects an acceleration The display mode data 75 indicates whether the display mode of the upper LCD 22 is the stereoscopic display mode or the planar display mode.

The operation data 76 represents an operation performed on each of the operation buttons 14A to 14E and 14G to 14H, and the analog stick 15.

The image display program 77 includes a virtual object display program (main routine shown in FIG. 10), a view matrix calculation processing program (sub-routine shown in FIG. 11), and a virtual object processing program (sub-routine shown in FIG. 12), which will be described below. Programs other than those described above are used for displaying, on the upper LCD 22, an image including a virtual object. However, the other programs are less relevant to the essential portion of the present invention, and the description thereof is not given.

The virtual object display program is used to display, on the upper LCD 22, an image in which a virtual object in a virtual space is superimposed on a real world (actual world) image photographed by the outer imaging section 23, with a natural augmented reality effect, in a stereoscopically visible manner. Specifically, although an error (deviation) of a position at which the virtual object is displayed may occur due to an error in marker detection, the error (deviation) is corrected to display the virtual object. In addition to the main routine, a program (the view matrix calculation processing program) for calculating a plurality of view matrixes which are selectively used depending on a distance between the marker (the center position of the marker) and the virtual object, and a program (the virtual object processing program) for assigning one of the view matrixes for each virtual object. The view matrix is a matrix based on a position and an orientation of a virtual camera. Specifically, the view matrix is a coordinate transformation matrix for transforming a coordinate of a marker coordinate system for the virtual space, to a coordinate of a virtual camera coordinate system based on the position and the orientation of the virtual camera. Namely, the position and the orientation of the virtual camera are represented by the view matrix. The marker coordinate system is a coordinate system in which the position, in the virtual space, corresponding to the position of the marker in the real space is defined as the originating point.

Figure 9:
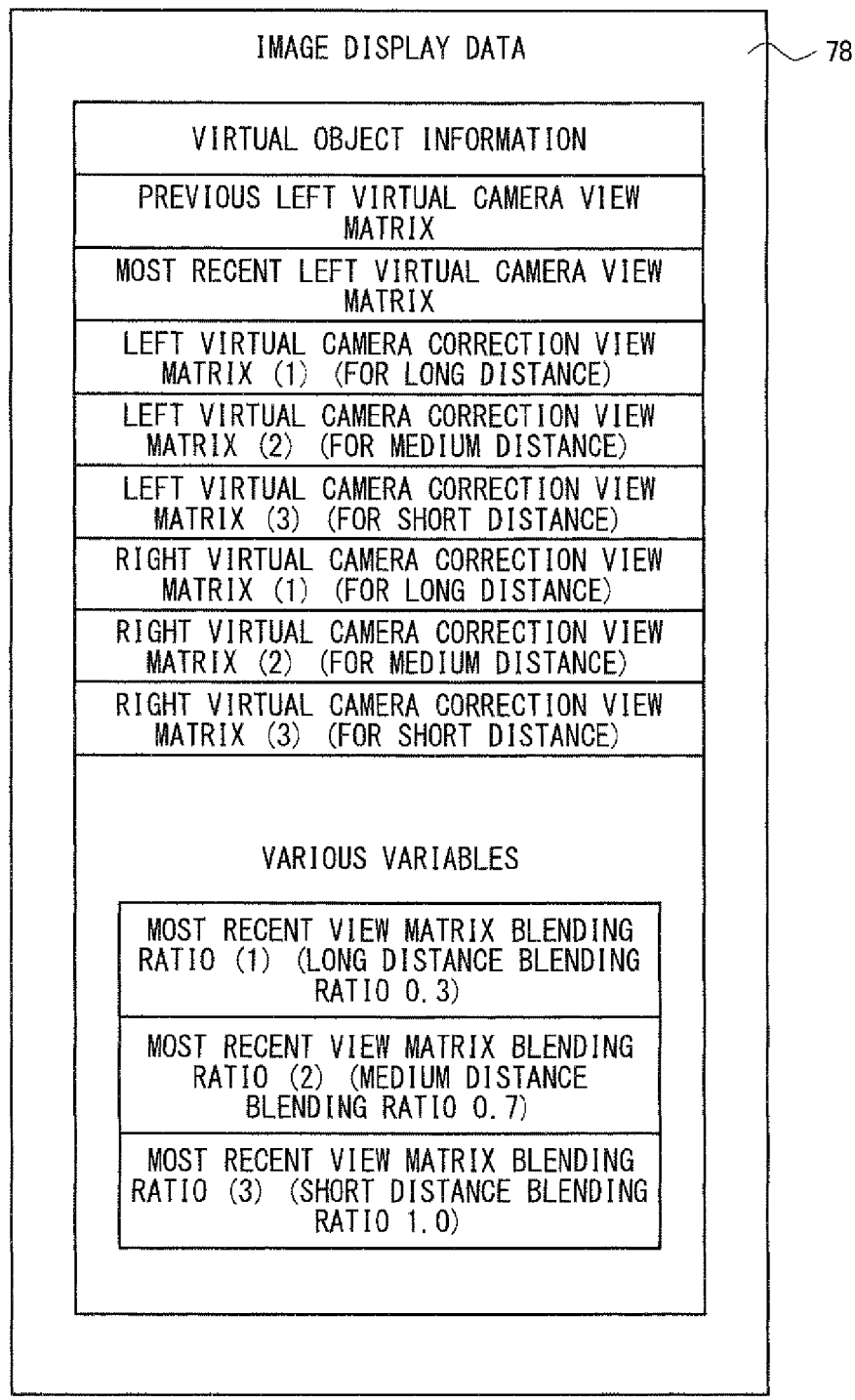
FIG. 9 is a diagram illustrating in detail image display data shown in FIG. 8.

The image display data 78 is stored when the programs described above are executed. Specifically, as shown in FIG. 9, the image display data 78 includes virtual object information, a previous left virtual camera view matrix, a most recent left virtual camera view matrix, left virtual camera correction view matrixes (1) to (3), right virtual camera correction view matrixes (1) to (3), and various variables.

The virtual object information is information for a virtual object to be superimposed and displayed on a real world image photographed by the outer imaging section 23. For example, the virtual object information includes: the number M (M is a natural number) of the virtual objects; information indicating a distance between the marker and each of the M virtual objects; information indicating whether or not each virtual object is a moving object; information indicating a type of a correction view matrix to be used for each virtual object (information which enables identification of a selected one of correction view matrixes (1) to (3) described below, for each virtual object); and the like.

The previous left virtual camera view matrix and the most recent left virtual camera view matrix each represent a left virtual camera view matrix. The previous left virtual camera view matrix represents a view matrix immediately preceding the most recent view matrix in cycles in which the main routine is repeatedly executed, and the most recent left virtual camera view matrix is the most recent view matrix in each main routine cycle. The previous left virtual camera view matrix may be a view matrix which precedes the most recent view matrix by two main routine cycles. In this case, the most recent left virtual camera view matrix may be the most recent view matrix in the immediately preceding main routine cycle. Namely, the previous left virtual camera view matrix may be a view matrix which precedes the most recent left virtual camera view matrix, and which is obtained at such a time as not to prevent the virtual object from following an operation performed on the game apparatus 10 by a user.

The left virtual camera correction view matrixes (1) to (3) are each a coordinate transformation matrix for transformation from the world coordinate system to the view coordinate system, and the process of the transformation includes a process for correcting a position at which the virtual object is displayed. When the distances between each virtual object and the marker are classified into three categories, the left virtual camera correction view matrixes (1) to (3) are selectively used depending on the distances. The left virtual camera correction view matrix (1) is a view matrix which is used when a distance between the marker and the virtual object is long. The left virtual camera correction view matrix (2) is a view matrix which is used when a distance between the marker and the virtual object is medium. The left virtual camera correction view matrix (3) is a view matrix which is used when a distance between the marker and the virtual object is short. The right virtual camera correction view matrixes (1) to (3) are obtained by performing parallel translation of the left virtual camera correction view matrixes (1) to (3), respectively. The number of the categories of the distance is not limited to three.

In the present embodiment, a correction view matrix is calculated, by blending the previous view matrix and the most recent view matrix. Specifically, a latest view matrix is calculated based on the previous view matrix and the most recent view matrix. Ratios for blending the most recent view matrix when such a correction view matrix is calculated are stored as various variables. As shown in FIG. 9, for example, a long distance blending ratio of 0.3 is stored as the most recent view matrix blending ratio (1), a medium distance blending ratio of 0.7 is stored as the most recent view matrix blending ratio (2), and a short distance blending ratio of 1.0 is stored as the most recent view matrix blending ratio (3). The setting of the blending ratios in this manner will be specifically described. The correction view matrix used for a virtual object when the distance between the virtual object and the marker is long is a matrix in which 30% of the most recent view matrix and 70% of the previous view matrix are blended. Specifically, in this case, a degree to which the most recent view matrix is blended is small and the degree of the correction is great. The correction view matrix used for a virtual object when the distance between the virtual object and the marker is medium is a matrix in which 70% of the most recent view matrix and 30% of the previous view matrix are blended. Specifically, in this case, a degree to which the most recent view matrix is blended is great, and the degree of the correction is small. The correction view matrix used for a virtual object when the distance between the virtual object and the marker is short is a matrix in which 100% of the most recent view matrix and 0% of the previous view matrix are blended. Specifically, only the most recent view matrix is used and the previous view matrix is not used, so that the correction is not performed. The degree of the correction is changed depending on the distance between the marker and the virtual object because the longer the distance between the marker and the virtual object is, the greater the deviation of a display position of the virtual object is. This will be described in detail below.

Figure 10:
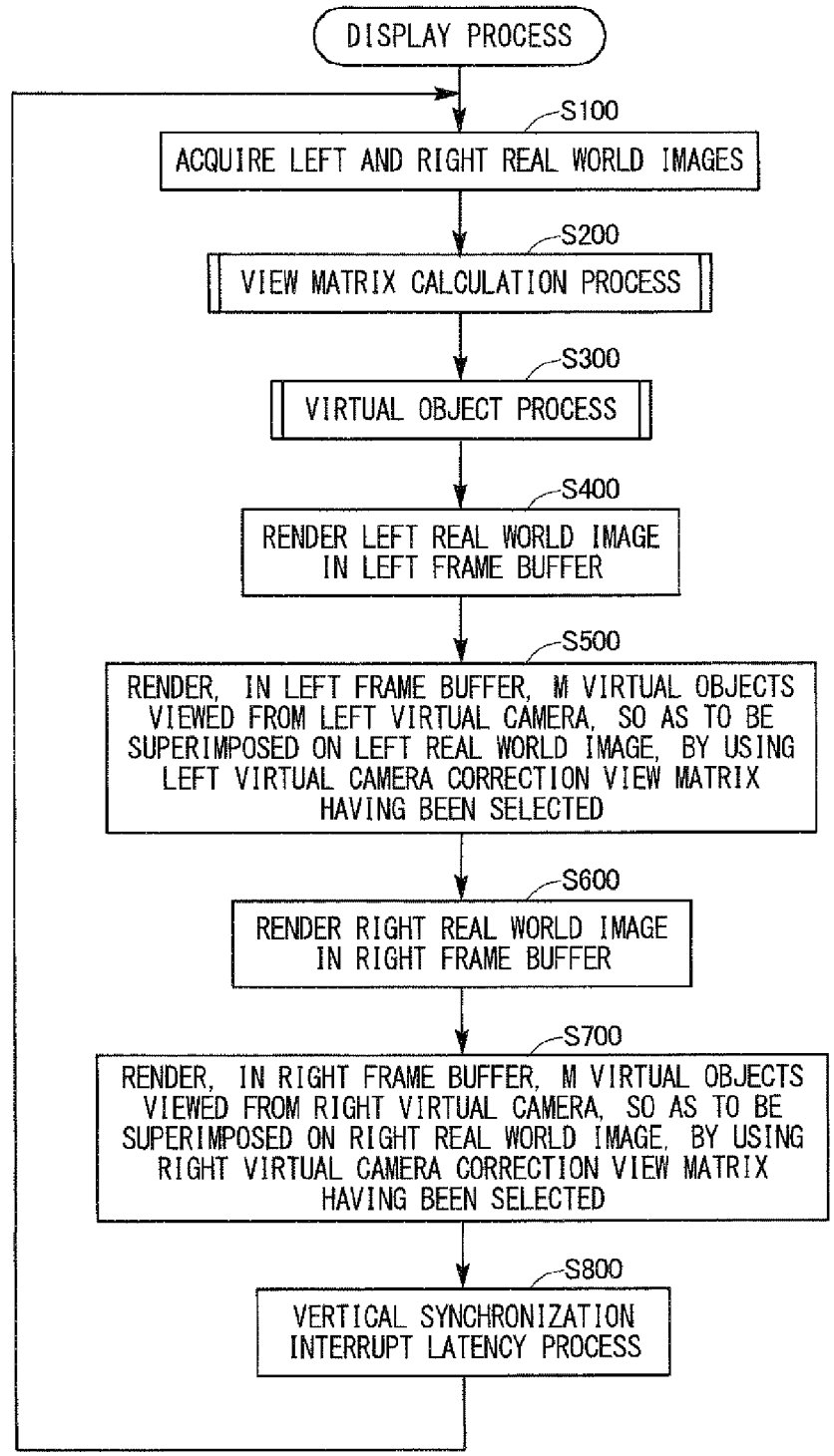
FIG. 10 is a main flow chart illustrating in detail a virtual object display process according to a first embodiment.

Next, the virtual object display process will be described in detail with reference to FIG. 10 to FIG. 12. FIG. 10 is a main flow chart (main routine) showing in detail the virtual object display process according to the present embodiment. When the game apparatus 10 is powered on, the information processing section 31 (the CPU 311) of the game apparatus 10 executes a start-up program stored in a ROM which is not shown, thereby initializing the respective units such as the main memory 32. Next, the virtual object display program stored in the internal data storage memory 35 is loaded to the main memory 32, and the execution of the program is started by the CPU 311 of the information processing section 31.

Figure 11:
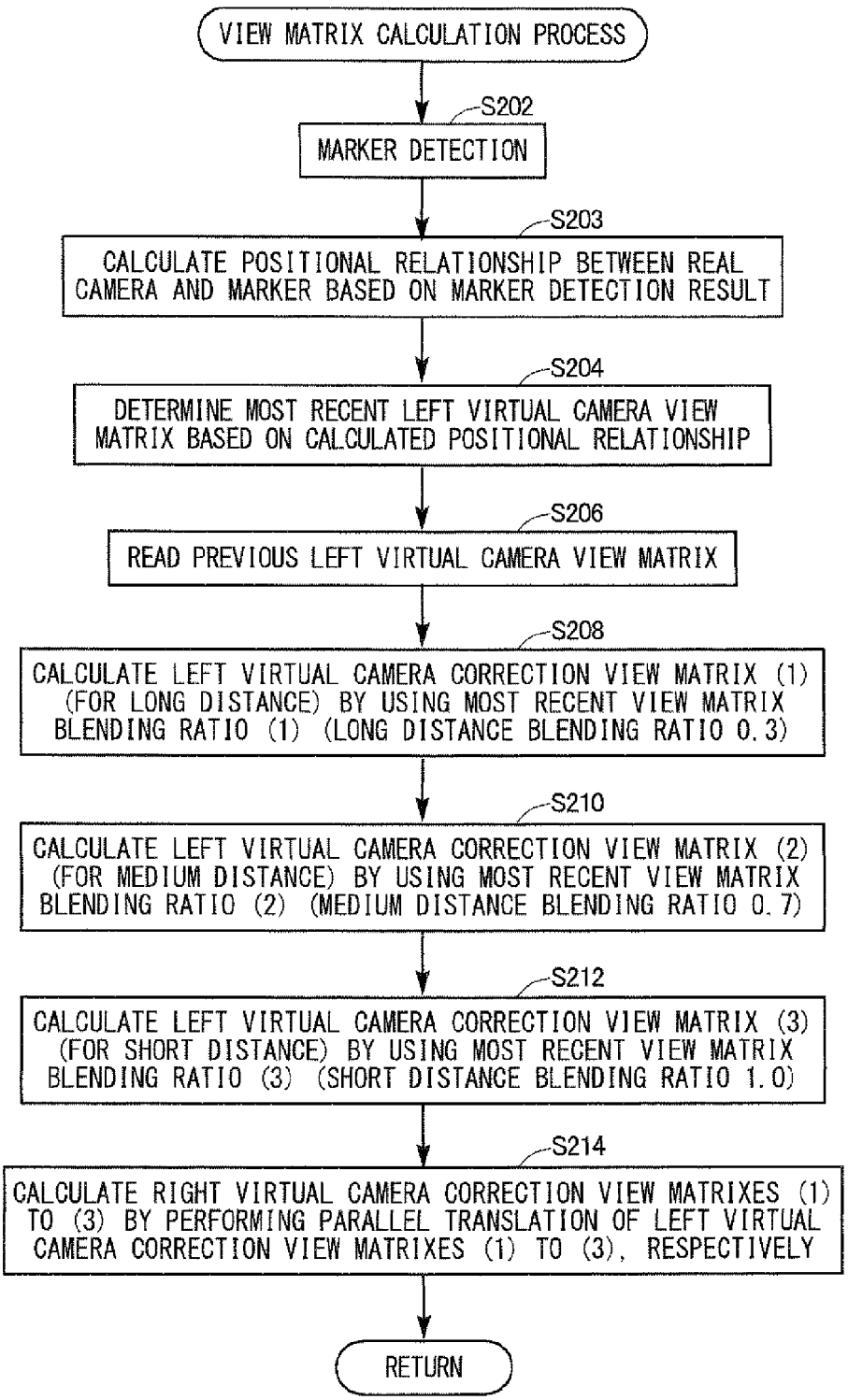
FIG. 11 is a flow chart illustrating in detail a view matrix calculation process (step S200) shown in FIG. 10.
Figure 12:
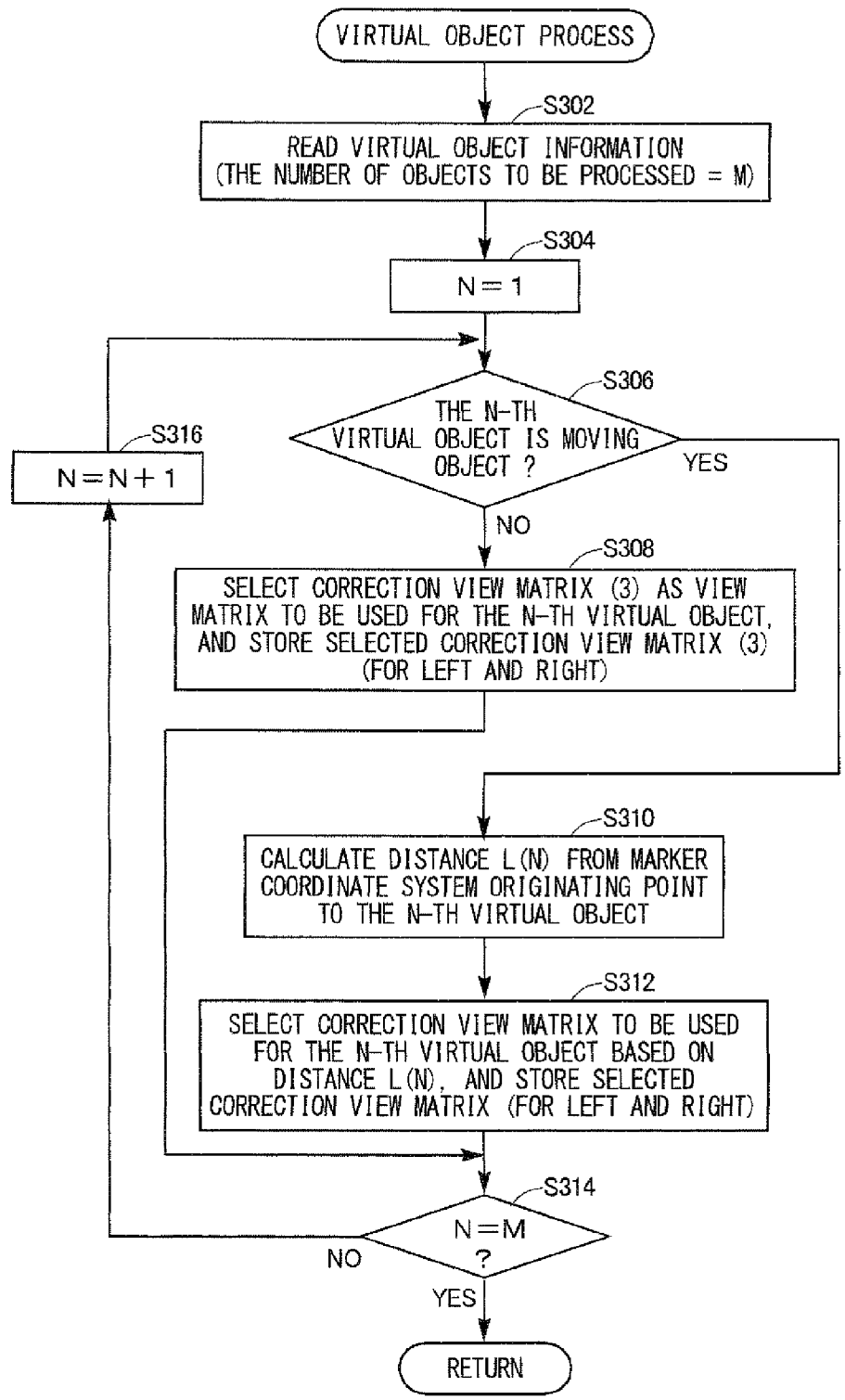
FIG. 12 is a flow chart illustrating in detail a virtual object process (step S300) shown in FIG. 10.

FIG. 11 shows in detail a flow chart (sub-routine) of the view matrix calculation process (step S200) shown in FIG. 10. FIG. 12 shows in detail a flow chart (sub-routine) of the virtual object process (step S300) shown in FIG. 10. A process loop of step S100 to step S800 shown in FIG. 10 is repeatedly executed in each frame (one frame corresponds to, for example, 1/30 seconds, and this is referred to as a frame time). In the program which is repeatedly executed in such a manner, an immediately preceding process is referred to as one cycle preceding process. Therefore, the most recent view matrix in an immediately preceding cycle is the previous view matrix in the most recent cycle. The previous view matrix may not be the most recent view matrix in an immediately preceding cycle. A view matrix which is less influenced by deviation may be used as the previous view matrix. Further, in the following description, the outer imaging section 23 is selected as the imaging section, and the stereoscopic display mode is selected as the display mode. However, the present invention may be applied to the planar display mode as well as the stereoscopic display mode. When only the process for a left eye in the stereoscopic display mode described below is performed, the process far the plane display mode can be performed.

Firstly, the main routine of the virtual object display process will be described with reference to FIG. 10. In step S100, the information processing section 31 acquires a left and a right real world images. Specifically, the information processing section 31 acquires image data representing an image photographed by the most recently selected camera, and stores the image data in the VRAM 313. In the present embodiment, the outer imaging section 23 is selected. Therefore, the information processing section 31 acquires a right real world image and a left real world image which are photographed by the outer imaging section 23.

In step S200, the information processing section 31 executes a view matrix calculation process for performing correction. The view matrix calculation process of step S200 is shown as a sub-routine, and will be described in detail below.

In step S300, the information processing section 31 executes a virtual object process for selecting a correction view matrix to be used for each virtual object. The virtual object process of step S300 is shown as a sub-routine, and will be described in detail below.

In step S400, the information processing section 31 renders the left real world image in a left frame buffer. The process can be performed by using a known technique.

In step S500, the information processing section 31 renders, in the left frame buffer, M virtual objects as viewed from the left virtual camera so as to be superimposed on the left real world image, by using the left virtual camera correction view matrix having been selected.

In step S600, the information processing section 31 renders the right real world image in a right frame buffer. The process can be performed by using a known technique in the same manner as used in step S400.

In step S700, the information processing section 31 renders, in the right frame buffer, M virtual objects as viewed from the right virtual camera so as to be superimposed on the right real world image, by using the right virtual camera correction view matrix having been selected.

In step S800, the information processing section 31 performs a vertical synchronization interrupt latency process which corresponds to a process for rendering in the upper LCD 22. At this time, images having been rendered in the left frame buffer and the right frame buffer are combined with each other so as to display the obtained image on the upper LCD 22 in a stereoscopically visible manner by using the parallax barrier method.

Next, the subroutine of the view matrix calculation process will be described with reference to FIG. 11. In step S202, the information processing section 31 detects a marker in the image photographed by the outer imaging section (left) 23a of the outer imaging section 23. In the present embodiment, the marker includes a black square outline printed around the center of a piece of white paper, and an outline arrow printed in the square outline. However, the marker may not necessarily have such a shape, pattern, and color. The marker may have any shape, pattern, and color when the shape, pattern, and color enable identification of the position (positions of four points in the present embodiment) and the direction of the marker. Specifically, the information processing section 31 initially extracts an area formed by four line segments being connected, from the image photographed by the outer imaging section 23, and determines a pattern image in the extracted area formed by the four line segments. The information processing section 31 calculates a degree of similarity between pattern image data representing the determined pattern image and pattern image data which is previously stored in the external memory 44. When a value representing the degree of similarity which indicates the result of the calculation is greater than or equal to a predetermined threshold value, the marker is detected.

In step S203, the information processing section 31 calculates a positional relationship between a real camera and the marker, based on the marker detection result. In step S204, the information processing section 31 sets the most recent left virtual camera view matrix, based on the calculated positional relationship between the real camera and the marker. The most recent left virtual camera view matrix having been set is stored, as the most recent left virtual camera view matrix, in the image display data 78 of the data storage area 70 in the main memory 32.

In step S206, the information processing section 31 reads the previous left virtual camera view matrix stored in the image display data 78 of the data storage area 70 in the main memory 32. The previous left virtual camera view matrix has been the most recent left virtual camera view matrix in the immediately preceding cycle.

In step S208, the information processing section 31 calculates the left virtual camera correction view matrix (1) (for a long distance) by using the most recent view matrix blending ratio (1) (long distance blending ratio 0.3). At this time, conceptually (namely, when represented as a matrix operation), the correction view matrix is calculated so as to satisfy the correction view matrix=the most recent view matrix× 30%+the previous view matrix×70%. The correction view matrix is obtained by blending 30% of the most recent view matrix, and 70% of the previous view matrix having been held, so that a view matrix for the great degree of the correction is obtained. The left virtual camera correction view matrix (1) (for a long distance) having been calculated is stored as the image display data 78 of the data storage area 70 in the main memory 32.

In step S210, the information processing section 31 calculates the left virtual camera correction view matrix (2) (for a medium distance) by using the most recent view matrix blending ratio (2) (medium distance blending ratio 0.7). At this time, conceptually, the correction view matrix is calculated so as to satisfy the correction view matrix=the most recent view matrix×70%+the previous view matrix×30%. The correction view matrix is obtained by blending 70% of the most recent view matrix, and 30% of the previous view matrix having been held, so that a view matrix for the small degree of the correction is obtained. The left virtual camera correction view matrix (2) (for a medium distance) having been calculated is stored as the image display data 78 of the data storage area 70 in the main memory 32.

In step S212, the information processing section 31 calculates the left virtual camera correction view matrix (3) (for a short distance) by using the most recent view matrix blending ratio (3) (short distance blending ratio 1.0). At this time, conceptually, the correction view matrix is calculated so as to satisfy the correction view matrix=the most recent view matrix×100%+the previous view matrix×0%. The correction view matrix is obtained by using the most recent view matrix only, and the obtained view matrix is a view matrix by which no correction is made. The left virtual camera correction view matrix (3) (for a short distance) having been calculated is stored as the image display data 78 of the data storage area 70 in the main memory 32.

In step S214, the information processing section 31 performs parallel translation of the left virtual camera correction view matrixes (1) to (3) to calculate right virtual camera correction view matrixes (1) to (3), respectively. The displacement of the parallel translation is separately calculated by the information processing section 31. The right virtual camera correction view matrixes (1) to (3) having been calculated are stored as the image display data 78 of the data storage area 70 in the main memory 32. Thereafter, the process ends (returns to the main routine).

Next, the sub-routine of the virtual object process will be described with reference to FIG. 12. In step S302, the information processing section 31 reads the virtual object information stored as the image display data 78 of the data storage area 70 in the main memory 32. A case in which the number of the virtual objects to be processes is M will be described.

In step S304, the information processing section 31 assigns 1 to a variable N to perform initialization. In step S306, the information processing section 31 determines whether or not the N-th virtual object is a moving object. At this time, the information processing section 31 determines whether or not the N-th virtual object is a moving object, based on the information which is included in the virtual object information having been read and indicates whether or not the corresponding object is a moving object. When the N-th virtual object is determined as a moving object (YES in step S306), the process shifts to step S310. Otherwise (No in step S306), the process shifts to step S308.

In step S308, the information processing section 31 selects and stores the correction view matrix (3) as a view matrix to be used for the N-th virtual object. The correction view matrix (3) is a correction view matrix for a short distance, and the use of the correction view matrix (3) indicates that no correction is made. If a display position of a stationary virtual object is corrected when a display position of a virtual object is corrected for reducing an influence of an error in marker detection, a user may feel unnatural. Therefore, a display position of a stationary object is not corrected. Information which enables identification of a type of the correction view matrix having been selected is stored as the virtual object information. It is noted that the left virtual camera correction view matrix and the right virtual camera correction view matrix to be used for the N-th virtual object are stored. Thereafter, the process shifts to step S314.

In step S310, the information processing section 31 calculates a distance L(N) from an originating point of the marker coordinate system to the N-th virtual object. At this time, the information processing section 31 calculates the distance L(N) based on the information which is included in the virtual object information having been read, and which indicates a distance between the marker and the virtual object.

In step S312, the information processing section 31 selects and stores the correction view matrix to be used for the N-th virtual object based on the distance L(N). At this time, information which enables identification of a type of the correction view matrix having been selected is stored as the virtual object information. It is noted that the left virtual camera correction view matrix and the right virtual camera correction view matrix to be used for the N– the virtual object are stored.

In step S314, the information processing section 31 determines whether or not the variable N is equal to the number M of the virtual objects. When it is determined that N=M is satisfied (YES in step S314), the process ends (returns to the main routine). Otherwise (NO in step S314), the process shifts to step S316.

In step S316, the information processing section 31 adds 1 to the variable N. Thereafter, the process is returned to S306, and the information processing section 31 repeats the selection and storage process steps as described above until the correction view matrixes for all the virtual objects (M virtual objects) to be processed are selected and stored.

An operation performed by the game apparatus 10 according to the present embodiment based on the flow chart and the structure as described above will be described with reference to FIG. 13 to FIG. 16. In FIG. 13 to FIG. 16, the game apparatus 10 realizes an antitank game (shooting game). A tank corresponding to an opponent is displayed, on the upper LCD 22, at the originating point of the marker which is detected in an image photographed by the outer imaging section 23, and the tank shoots a bullet at a user. When the user presses a predetermined button (for example, the operation button 14B) so as to intercept the bullet, a state in which a bullet is shot toward the tank is displayed on the upper LCD 22. In the following description, such a bullet is described as the virtual object, and the display position of the virtual object which is the bullet is corrected. However, the application of the present invention is not limited to such a shooting game.

(Operation for Displaying Virtual Object)

A user selects the outer imaging section 23, and selects the stereoscopic display mode to set the execution of the programs described above. For example, a left and a right real world images are acquired by a user photographing a range including the marker on a desk by using the outer imaging section 23 (step S100). The marker is detected (step S202), and the most recent left virtual camera view matrix is set based on the marker detection result (step S204). Further, the previous left virtual camera view matrix is read (step S206). Thus, the most recent view matrix, and the view matrix obtained in the immediately preceding cycle are set for the left virtual camera.

The left virtual camera correction view matrixes (1) to (3) are calculated by using the most recent view matrix blending ratios (1) to (3), respectively, and are stored as the image display data 78 (step S208 to step S210). Further, the right virtual camera correction view matrixes (1) to (3) are calculated by performing parallel translation of the left virtual camera correction view matrixes (1) to (3), respectively, having been calculated, and are stored as the image display data 78 (step S214).

Through the view matrix calculation process (step S200) as described above, the left virtual camera correction view matrix (1) and the right virtual camera correction view matrix (1) which are used for a virtual object which is separated from the marker by a long distance, the left virtual camera correction view matrix (2) and the right virtual camera correction view matrix (2) which are used for a virtual object which is separated from the marker by a medium distance, and the left virtual camera correction view matrix (3) and the right virtual camera correction view matrix (3) which are used for a virtual object which is separated from the marker by a short distance, are prepared. The correction view matrixes are used for correcting errors in display position of the virtual object stepwise, based on the characteristics (distance from the marker) of the virtual objects.

Next, the virtual object information is read (step S302), and the variable N is initialized so as to satisfy N=1 (step S304). Since the first virtual object is a moving object (YES in step S306), the distance L(1) between the first virtual object and the originating point (the position of the marker) of the marker coordinate system is calculated (step S310).

When the distance L(1) is greater than or equal to a threshold value corresponding to the lower limit of the long distance (that is, when the distance between the virtual object and the marker is long), the left virtual camera correction view matrix (1) and the right virtual camera correction view matrix (1) are selected and stored as the correction view matrix to be used for the first virtual object (step S312).

When the distance L(1) is less than the threshold value corresponding to the lower limit of the long distance, and is greater than or equal to a threshold value corresponding to the lower limit of the medium distance (that is, when the distance between the virtual object and the marker is medium), the left virtual camera correction view matrix (2) and the right virtual camera correction view matrix (2) are selected and stored as the correction view matrix to be used for the first virtual object (step S312).

When the distance L(1) is less than the threshold value corresponding to the lower limit of the medium distance (that is, when the distance between the virtual object and the marker is short), the left virtual camera correction view matrix (3) and the right virtual camera correction view matrix (3) are selected and stored as the correction view matrix to be used for the first virtual object (step S312).

In these manners, the process for selecting the correction view matrix is repeated for the first virtual object to the M-th virtual object. Through the virtual object process (step S300) as described above, the left virtual camera correction view matrix and the right virtual camera correction view matrix are selected for all the virtual objects to be processed, based on the distance from the marker, and information indicating the correction view matrix to be used for each virtual object is stored.

Thus, when a plurality of the correction view matrixes are prepared, and the information indicating the correction view matrix to be used for each virtual object is prepared, the left real world image is rendered in the left frame buffer (step S400), and the first to the M-th virtual objects, that is, M virtual objects, are rendered in the left frame buffer so as to be superimposed on the left real world image by using the left virtual camera correction view matrix having been selected for each virtual object (step S500).

When the process for rendering in the left frame buffer is ended, the right real world image is rendered in the right frame buffer (step S600), and the first to the M-th virtual objects, that is, M virtual objects, are rendered in the right frame buffer so as to be superimposed on the right real world image by using the right virtual camera correction view matrix having been selected for each virtual object (step S700).

Thus, when the process for rendering in the left frame buffer (the process for superimposing the virtual objects for a left eye on the left real world image) and the process for rendering in the right frame buffer (the process for superimposing the virtual objects for a right eye on the right real world image) are ended, a vertical synchronization interrupt latency process is performed, and an image rendered in the left frame buffer and an image rendered in the right frame buffer are combined with each other, so that the combined image is displayed on the upper LCD 22 in a stereoscopically visible manner (step S800).

(Correction of Display Position of Virtual Object)

Figure 13:
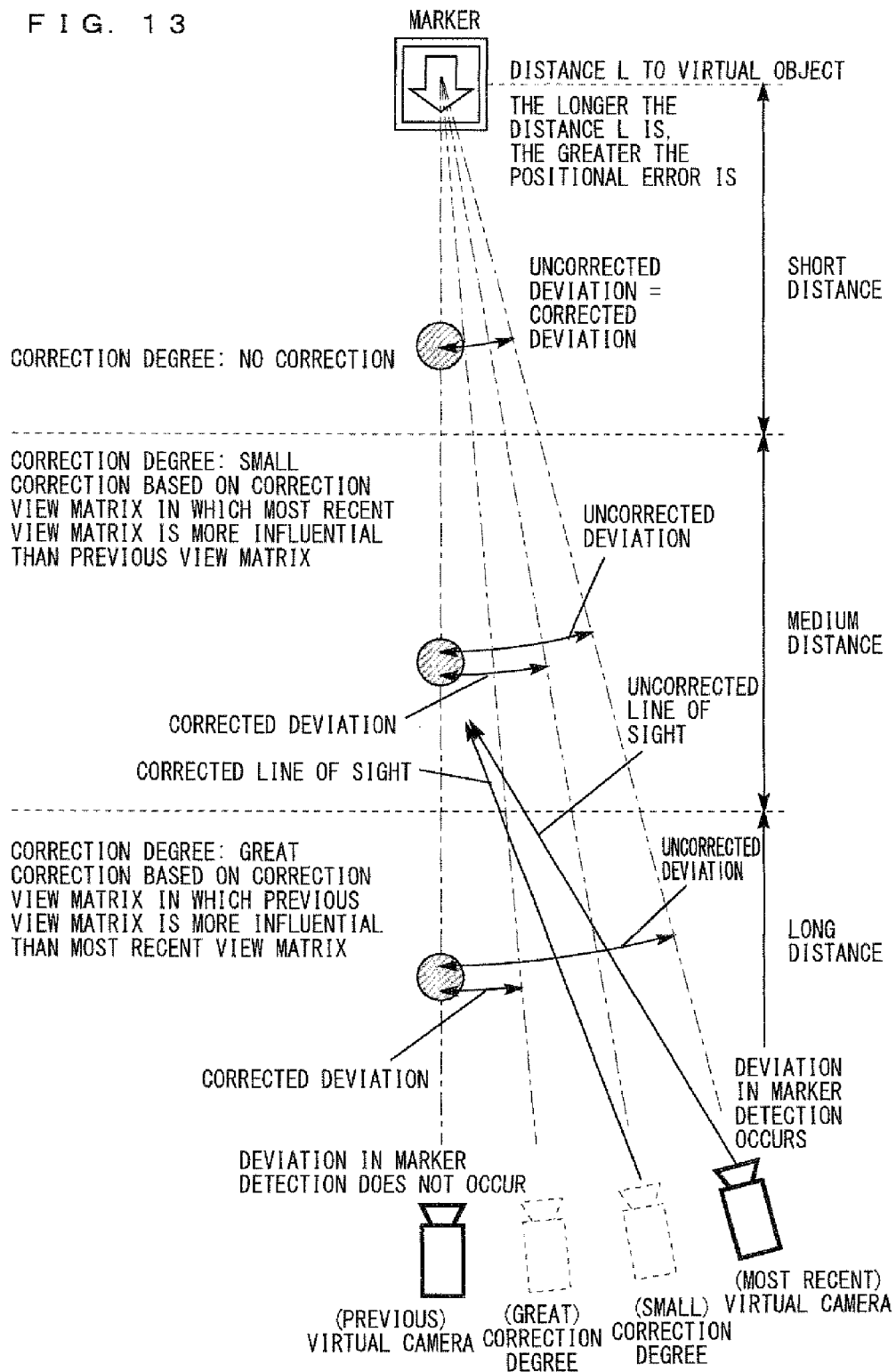
FIG. 13 is a conceptual diagram illustrating a state in which a display position of a virtual object is corrected.

A specific example of display of the virtual object (bullet in the present embodiment) will be described with reference to FIG. 13. A case where a bullet generated by the game apparatus 10 operating as described above is located as follows will be described. Namely, a case where the bullet is separated from the originating point of the marker coordinate system by a short distance, a case where the bullet is separated from the originating point of the marker coordinate system by a medium distance, and a case where the bullet is separated from the originating point of the marker coordinate system by a long distance, will be described. In FIG. 13, bullets are represented by circles having diagonal lines drawn therein.

As shown in FIG. 13, the longer the distance L between the virtual object and the originating point of the marker coordinate system is, the greater the deviation in display position of the virtual object is. This is caused by an angular component contained in the error in marker detection. Namely, an error ("uncorrected deviation" in FIG. 13) in position of the virtual object which is separated from the marker by a long distance is greater than an error in position of the virtual object which is separated from the marker by a short distance although an angular error is the same therebetween.

It is assumed that, in a state where the process of the main flow chart shown in FIG. 10 is repeated, the position of the virtual camera in a certain cycle is a position represented by "(previous) virtual camera" in FIG. 13, and, in the immediately following cycle, the view matrix of the virtual camera including an error in maker detection is calculated, and the position of the virtual camera is changed to "(most recent) virtual camera" in FIG. 13. In this case, the bullet which is separated from the marker by a medium distance, and which has been taken by the "(previous) virtual camera" so as to be displayed at the center of the upper LCD 22 in the immediately preceding cycle, may be viewed from the "(most recent) virtual camera" (uncorrected line of sight) in the most recent cycle if no correction is made. Therefore, the bullet which is separated from the marker by the medium distance, and which has been displayed at the center of the upper LCD 22 in the immediately preceding cycle is displayed near the left end portion of the upper LCD 22 in the most recent cycle, thereby preventing realization of a natural augmented reality effect.

The correction view matrix (2) (for a medium distance) is used for the virtual object (bullet) which is separated from the marker by a medium distance, to correct the display position of the virtual object. The correction view matrix (2) (for a medium distance) is for small correction. Therefore, the bullet which is separated from the marker by the medium distance, and which has been taken by the "(previous) virtual camera" so as to be displayed at the center of the upper LCD 22 in the immediately preceding cycle, is corrected in position in the most recent cycle, such that the bullet is viewed from the "virtual camera (for small correction degree)" (corrected line of sight). Therefore, the bullet which is separated from the maker by the medium distance, and which has been displayed at the center of the upper LCD 22 in the immediately preceding cycle, is displayed, in the most recent cycle, on the left side of the upper LCD 22 but near the center portion of the upper LCD 22, thereby realizing a natural augmented reality effect.

Further, when the deviation is great, namely, when a bullet is separated from the marker by a long distance, the bullet is displayed on the left end portion of the upper LCD 22 such that the bullet appears to the left of the bullet which has been separated from the marker by the medium distance. In this case, the bullet is actually located outside the display area of the upper LCD 22. Namely, the uncorrected deviation may be too great for a user to view the bullet. Such a virtual object is corrected in position in the most recent cycle to be viewed from the "virtual camera (for a great correction degree)". Therefore, it is possible to avoid a state in which the bullet which has been separated from the marker by the long distance, and which has been displayed at the center of the upper LCD 22 in the immediately preceding cycle, is invisible in the most recent cycle, and to display the bullet on the left side of the upper LCD 22 but near the center portion of the upper LCD 22, thereby realizing a natural augmented reality effect.

A bullet which is separated from the marker by a short distance is not corrected in position. This is because an error in display position of such a virtual object which is separated from the marker by a short distance is small, and the effect of the correction using the correction view matrix in which the previous view matrix is blended is small. Therefore, in the present embodiment, the correction view matrix (3) (for a short distance) includes no component from the previous view matrix.

(Screen of Game Apparatus)

Figure 14:
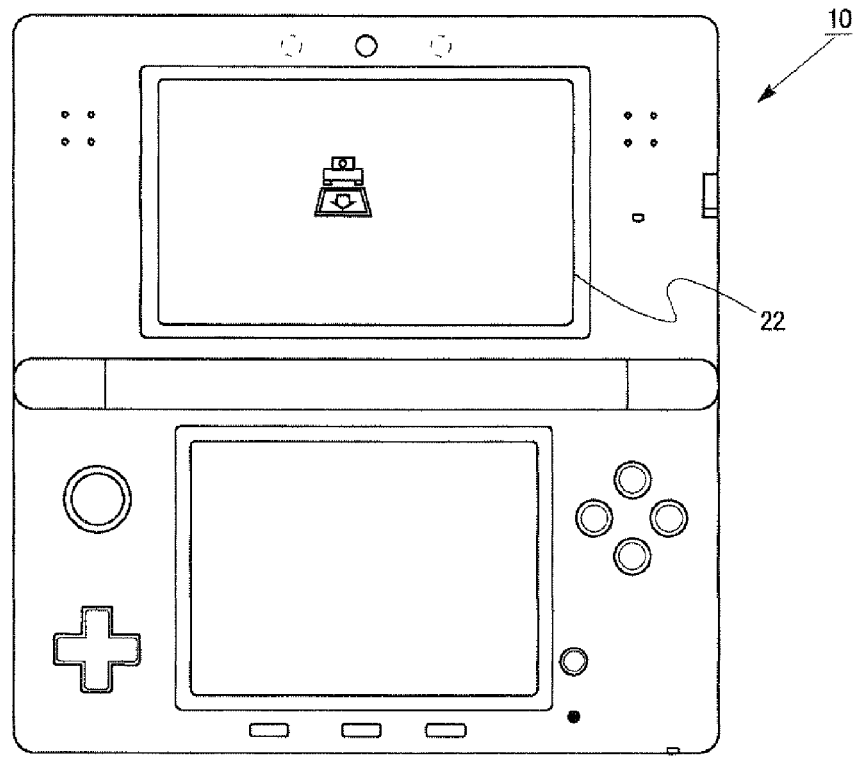
FIG. 14 is a diagram (1) illustrating a marker and a virtual object displayed on an upper LCD 22.

A screen, of the upper LCD 22 of the game apparatus 10, which is displayed when the display position of the virtual object is corrected, will be described. FIG. 14 shows an initial state of the antitank game. A tank corresponding to an opponent, and the marker are displayed at the originating point of the marker coordinate system. An image of a real world is also displayed, which is not shown in FIG. 14. Thus, the tank corresponding to the virtual object is displayed so as to be superimposed on the real world image, such that a natural augmented reality effect can be realized. Further, in this case, since the stereoscopic display mode is selected, the real world image and the virtual object image are displayed on the upper LCD 22 in the stereoscopically visible manner.

Figure 15A:
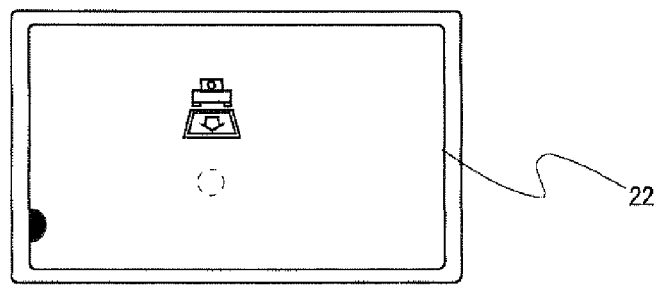
FIG. 15A is a diagram illustrating a state in which a position of an object which is separated from a marker by a medium distance as shown in FIG. 14 has not been corrected.

It is assumed that, when, after the game is started in this state, a bullet shot by the tank corresponding to the opponent reaches a position separated from the marker by a medium distance, the view matrix of the virtual camera including an error in marker detection is calculated, so that the position of the virtual camera is displaced. In this case, as shown in FIG. 15A, the bullet (circle drawn by a dotted line) which has been displayed at the center of the upper LCD 22 in the immediately preceding cycle, is displayed, in the most recent cycle, near the left end portion of the upper LCD 22 as indicated by a black circle. In this case, a natural augmented reality effect is not realized.

Figure 15B:
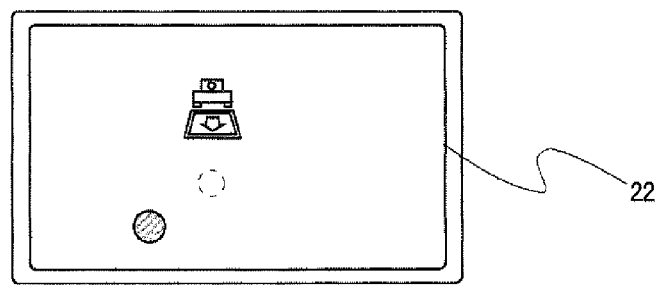
FIG. 15B is a diagram illustrating a state in which a position of the object which is separated from the marker by the medium distance as shown in FIG. 14 has been corrected.

In a case where the position of the virtual camera is displaced, when the display position of the virtual object is corrected by using the correction view matrix, the bullet (the circle drawn by the dotted line) which has been displayed at the center of the upper LCD 22 in the immediately preceding cycle is displayed on the left side of the upper LCD 22 but near the center portion of the upper LCD 22 as indicated by a circle having diagonal lines drawn therein, as shown in FIG. 15B. In this case, realization of a natural augmented reality effect is possible. If even the display position indicated by the circle having the diagonal lines drawn therein as shown in FIG. 15B is determined as deteriorating the augmented reality effect because the degree of the correction is small, this state can be improved by adjusting the most recent view matrix blending ratio (2) (medium distance blending ratio) so as to be reduced.

Figure 16:
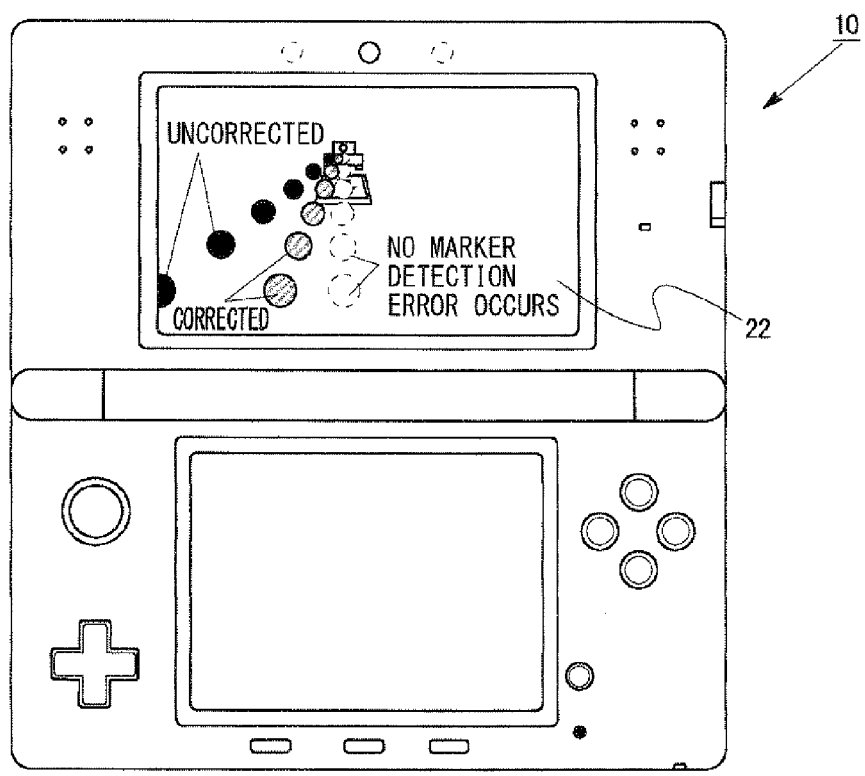
FIG. 16 is a diagram (2) illustrating the marker and a virtual object displayed on the upper LCD 22.

When the correction has been thus made, the virtual object, which may be displayed, (as a bullet indicated by the black circle), at a greatly deviated display position before corrected, is corrected in position such that the display position of the virtual object approaches the display position (the bullet indicated by the circle drawn by the dotted line) which includes no error in marker detection, as shown in FIG. 16. Thus, a natural augmented reality effect can be realized.

As described above, the game apparatus 10 according to the present embodiment is capable of correcting a display position of the virtual object and displaying the virtual object in a real world (real space) image photographed by the outer imaging section 23. In this case, the degree of the correction is changed in accordance with the distance between the virtual object and the marker, and therefore a natural augmented reality effect can be realized. Further, the virtual object (stationary object) which does not move is displayed without correcting the display position thereof, thereby preventing a user from feeling unnatural. On the other hand, since a user is less likely to recognize that a moving object which is the virtual object is viewed in a different manner even after the moving object has been corrected in position, the display position of the virtual object is corrected to realize a natural augmented reality effect. Specifically, when the virtual object is moving or floating, even if the display position of the virtual object is corrected (even if the previous view matrix is used for correction without immediately using the most recent view matrix), a user may not feel unnatural. Therefore, the display position of the moving object can be greatly corrected, thereby realizing a natural augmented reality effect.

Second Embodiment

Hereinafter, a second embodiment of the present technology will be described. In the first embodiment described above, a blending ratio between the most recent view matrix and the previous view matrix is changed for changing the degree of the correction, thereby calculating the correction view matrix. In a view matrix calculation process executed by the information processing section 31 of the game apparatus 10 according to the present embodiment, the most recent position and the most recent orientation (including errors) of the virtual camera calculated based on the most recent view matrix, and the previous position and the previous orientation of the virtual camera are blended to calculate the position and the orientation of the virtual camera to be used for correction, and the correction view matrix is then calculated. Further, in this case, a degree to which the previous position and the previous orientation of the virtual camera approach the most recent position and the most recent orientation of the virtual camera is controlled. Through such a process, sudden change from the previous position and the previous orientation of the virtual camera can be avoided, thereby enhancing an accuracy of the correction.

The game apparatus 10 which is an information processing apparatus according to the present embodiment is partially different from the game apparatus 10 according to the first embodiment, and the hardware configuration is the same therebetween. Only the partially different portions will be described below. Specifically, image display data and a view matrix calculation process are different therebetween. The portions other than those are the same between the first embodiment and the second embodiment, and will not be repeatedly described.

Figure 17:
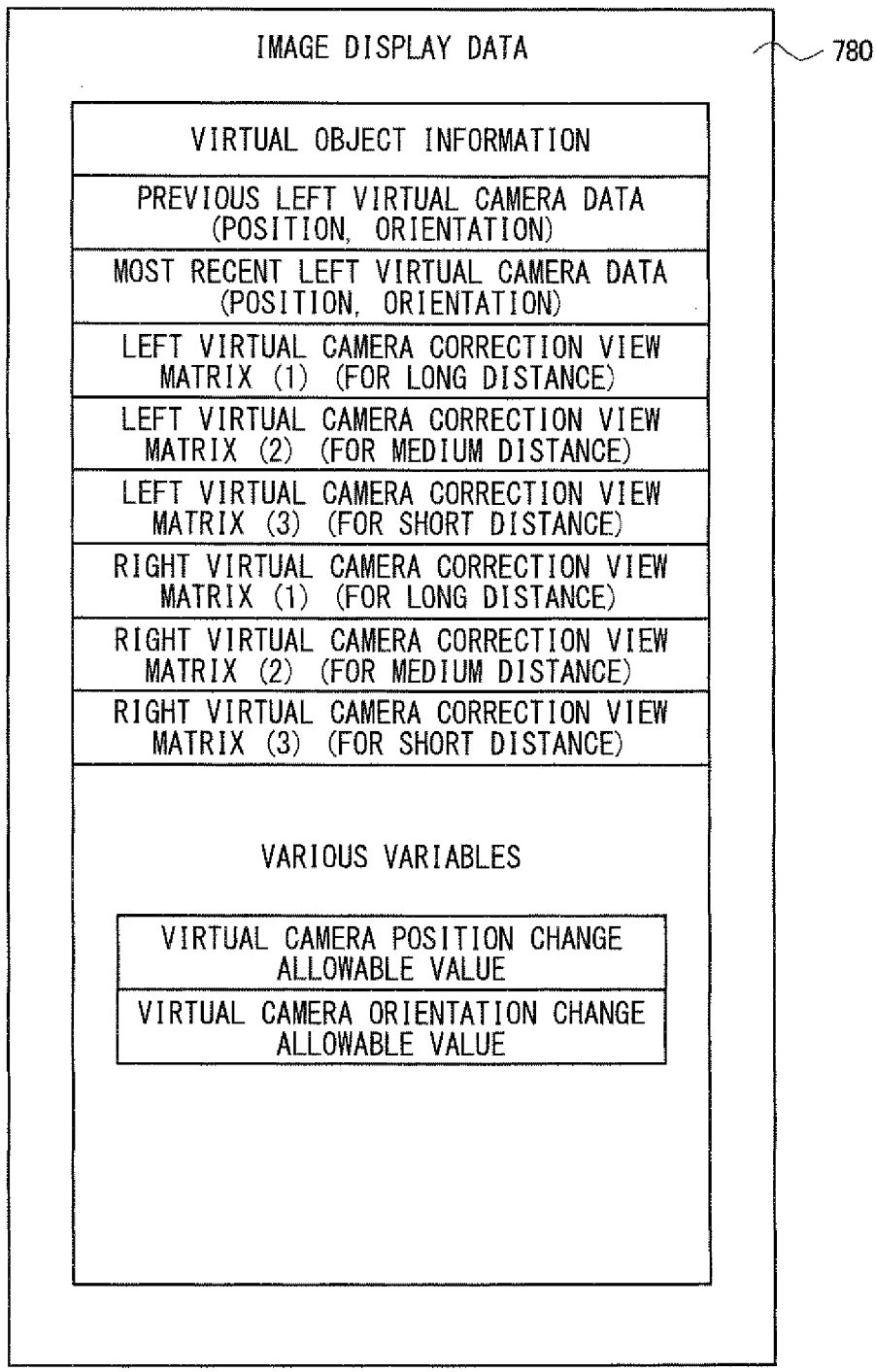
FIG. 17 is a diagram illustrating in detail image display data according to a second embodiment of the present invention.

FIG. 17 shows image display data 780 of the data storage area 70 in the main memory 32. FIG. 17 corresponds to FIG. 9 for the first embodiment. FIG. 17 is different from FIG. 9 in that the previous left virtual camera data (position and orientation) and the most recent left virtual camera data (position and orientation) are stored according to the second embodiment, instead of the previous left virtual camera view matrix and the most recent left virtual camera view matrix, respectively, according to the first embodiment, and the stored variables are different.

A virtual camera position change allowable value representing a change allowable value for an approach from the previous position of the virtual camera to the most recent position of the virtual camera, and a virtual camera orientation change allowable value representing a change allowable value for an approach from the previous orientation of the virtual camera to the most recent orientation of the virtual camera are stored as variables.

Figure 18:
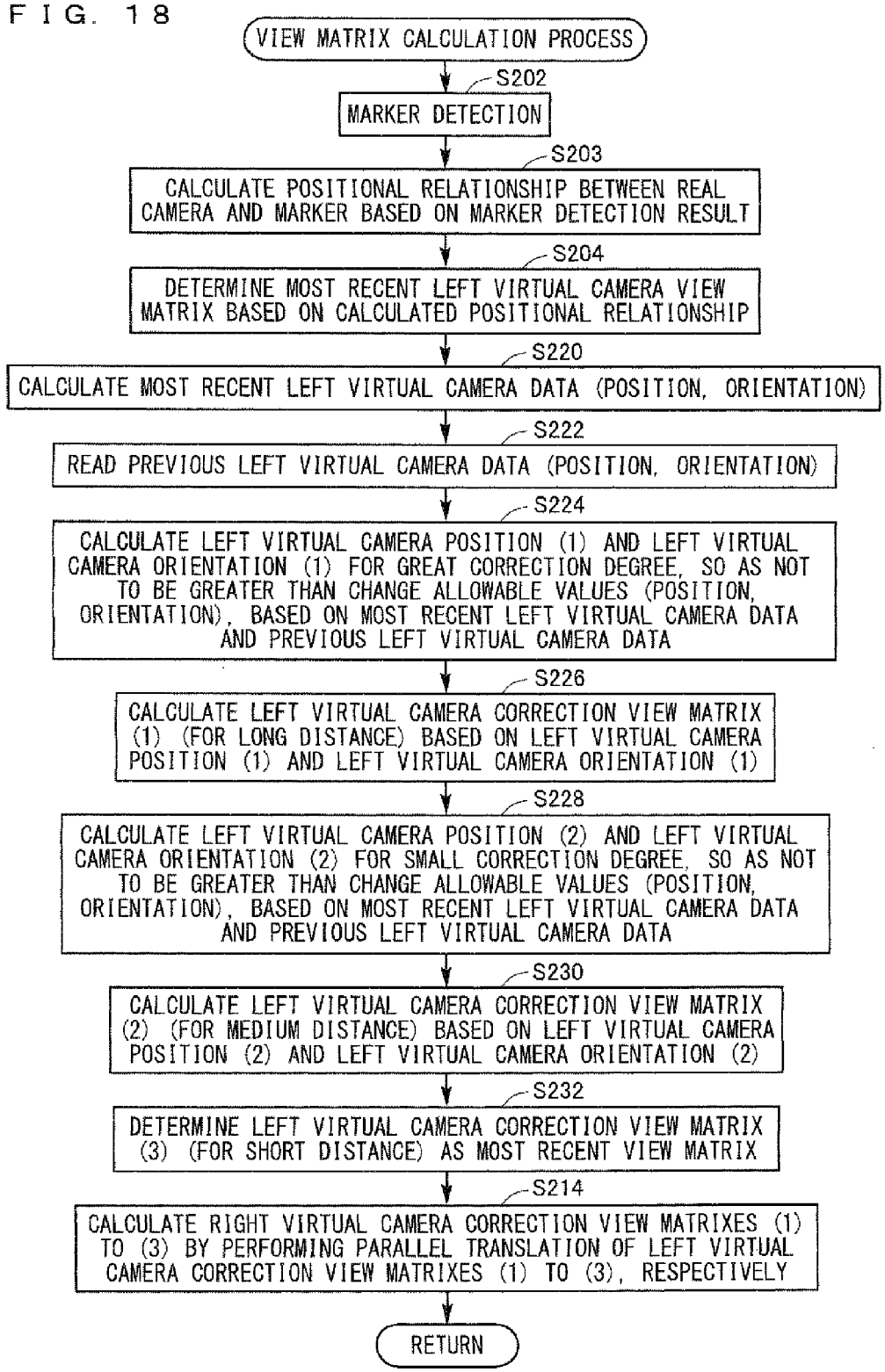
FIG. 18 is a flow chart showing in detail a view matrix calculation process according to a second embodiment.

A sub-routine which is a view matrix calculation process will be described with reference to FIG. 18. The main routine and the sub-routine which is the virtual object process are the same as those for the first embodiment. Further, FIG. 18 corresponds to FIG. 11 for the first embodiment, and the same process steps as those in FIG. 11 are denoted, in FIG. 18, by the same step numbers. The process steps denoted by the same step numbers are the same therebetween, and the detailed description is not given.

In step S220, the information processing section 31 calculates the most recent left virtual camera data (position and orientation) based on the most recent left virtual camera view matrix. In step S222, the information processing section 31 reads the previous left virtual camera data (position and orientation) stored in the image display data 780 of the data storage area 70 in the main memory 32. The previous left virtual camera data is data representing the position and the orientation of the left virtual camera which have been calculated based on the most recent left virtual camera view matrix having been calculated in the immediately preceding cycle.

In step S224, the information processing section 31 calculates the left virtual camera position (1) and the left virtual camera orientation (1) for a great correction degree, based on the most recent left virtual camera data and the previous left virtual camera data, so as not to be greater than the change allowable values (for position and orientation). At this time, "a great correction degree" means, if described by using the concept of the view matrix, that, for example, the correction is made so as to satisfy the correction view matrix=the previous view matrix+(the most recent view matrix−the previous view matrix)×30%. That is, the correction is made so as to approach the most recent view matrix, by 30% of the difference between the most recent view matrix and the previous view matrix.

In step S226, the information processing section 31 calculates the left virtual camera correction view matrix (1) (for a long distance) based on the left virtual camera position (1) and the left virtual camera orientation (1). The left virtual camera correction view matrix (1) (for a long distance) having been calculated is stored as the image display data 780 of the data storage area 70 in the main memory 32.

In step S228, the information processing section 31 calculates the left virtual camera position (2) and the left virtual camera orientation (2) for a small correction degree, based on the most recent left virtual camera data and the previous left virtual camera data, so as not to be greater than the change allowable values (for position and orientation). At this time, "a small correction degree" means, if described by using the concept of the view matrix, that, for example, the correction is made so as to satisfy the correction view matrix=the previous view matrix+(the most recent view matrix−the previous view matrix)×70%. That is, the correction is made so as to approach the most recent view matrix, by 70% of the difference between the most recent view matrix and the previous view matrix.

In step S230, the information processing section 31 calculates the left virtual camera correction view matrix (2) (for a medium distance) based on the left virtual camera position (2) and the left virtual camera orientation (2). The left virtual camera correction view matrix (2) (for a medium distance) having been calculated is stored as the image display data 780 of the data storage area 70 in the main memory 32.

In step S232, the information processing section 31 determines the left virtual camera correction view matrix (3) (for a short distance) as the most recent left virtual camera view matrix. Namely, the left virtual camera correction view matrix (3) is obtained without performing no correction. The degrees of the correction (which also represent categories of the distances between the marker and each virtual object) are not limited to three degrees as in the first embodiment.

An operation performed, by the game apparatus 10 according to the present embodiment, based on the flow chart and the structure described above, will be described. An exemplary display (FIG. 13 to FIG. 16) on the upper LCD 22 according to the first embodiment is the same as that for the game apparatus 10 according to the present embodiment.

A user selects the outer imaging section 23, and selects the stereoscopic display mode to set the execution of the programs described above. When the user photographs a range including the marker on, for example, a desk, by using the outer imaging section 23, a left and a right real world images are acquired (step S100). The marker is detected (step S202), the most recent left virtual camera view matrix is determined based on the result of the marker detection (step S204), and the most recent left virtual camera data (position and orientation) is calculated based on the most recent left virtual camera view matrix (step S220). Further, the previous left virtual camera data (position and orientation) is read (step S222). Thus, the most recent position and the most recent orientation of the left virtual camera, and the position and the orientation obtained in the immediately preceding cycle are set.

The left virtual camera position (1) and the left virtual camera orientation (1) for a great correction degree are calculated so as not to be greater than the change allowable values (so as to avoid great change of the position and the orientation of the virtual camera) (step S224).

The left virtual camera correction view matrix (1) (for a long distance) is calculated based on the left virtual camera position (1) and the left virtual camera orientation (1) having been calculated, and is stored (step S226).

Next, the left virtual camera position (2) and the left virtual camera orientation (2) for a small correction degree are calculated so as not to be greater than the change allowable values (step S228).

The left virtual camera correction view matrix (2) (for a medium distance) is calculated based on the left virtual camera position (2) and the left virtual camera orientation (2) having been calculated, and is stored (step S230).

Further, the left virtual camera correction view matrix (3) (for a short distance) is determined as the most recent left virtual camera view matrix (step S232). Therefore, the left virtual camera correction view matrix (3) (for a short distance) is a view matrix for performing no correction of the display position of the virtual object.

The right virtual camera correction view matrixes (1) to (3) are calculated by performing parallel translation of the left virtual camera correction view matrixes (1) to (3), respectively, having been calculated, and are stored as the image display data 780 (step S214).

In the view matrix calculation process (steps S202, S204, S220 to S232, and S214), the left virtual camera correction view matrix (1) and the right virtual camera correction view matrix (1) which are used for a virtual object which is separated from the marker by a long distance, the left virtual camera correction view matrix (2) and the right virtual camera correction view matrix (2) which are used for a virtual object which is separated from the marker by a medium distance, and the left virtual camera correction view matrix (3) and the right virtual camera correction view matrix (3) which are used for a virtual object which is separated from the marker by a short distance, are prepared. The subsequent process steps for the second embodiment is the same as those for the first embodiment.

As described above, the game apparatus 10 according to the present embodiment as well as the game apparatus according to the first embodiment corrects the display position of the virtual object and displays the virtual object, thereby enabling realization of a natural augmented reality effect. Further, since the change allowable values are set, even when the marker detection result includes a great error, the deviation of the display position of the virtual object can be reduced to be within a predetermined range.

(Modification)

In either of the embodiments described above, the display position of the virtual object is corrected by using the position and the orientation of the virtual camera (the view matrix of the virtual camera). However, the present technology is not limited thereto. For example, a position (a position relative to the virtual camera) of each virtual object may be corrected, based on the position of the virtual object as viewed from the most recent position of the virtual camera, and the position of the virtual object as viewed from the previous position of the virtual camera, in accordance with a distance from the originating point of the marker coordinate system, thereby correcting a deviation (error) of the display position of each virtual object.

Moreover, the degree of the correction may be changed in accordance with the distance between the virtual object and the virtual camera. In the case of perspective projection, the closer the virtual object is to the virtual camera, the greater the displayed virtual object is, which leads to increase of the deviation of the virtual object on the screen. Therefore, the correction degree may be determined such that the closer the virtual object is to the virtual camera, the greater the correction degree for the virtual object is.

Further, in the first embodiment described above, the previous view matrix is a view matrix having been calculated in the maker detection process in the immediately preceding cycle (the most recent view matrix in the immediately preceding cycle). However, the previous view matrix of the present invention is not limited to such a view matrix. For example, the previous view matrix may be a view matrix (the correction view matrix having been obtained in the immediately preceding cycle) which has been used for rendering the virtual object in the immediately preceding cycle. In this case, when the distances are classified into three, three view matrixes for a short distance, for a medium distance, and for a long distance are held as the previous view matrix. In this case, the view matrix to be used in the most recent cycle is generated based on the most recent view matrix and the correction view matrix having been obtained in the immediately preceding cycle. Namely, a latest position and a latest orientation of the virtual camera (view matrix to be used in the most recent cycle) are determined based on the position and the orientation of the virtual camera having been set in the most recent cycle (the most recent view matrix) and the position and the orientation (the correction view matrix in the immediately preceding cycle) of the virtual camera having been used when an object image of the virtual object in the virtual space has been generated in the immediately preceding cycle.

Moreover, the game apparatus 10 according to the present embodiment may execute a predetermined game. For example, a predetermined game program is stored in the internal data storage memory 35, or the external memory 44, and the game apparatus 10 executes the predetermined game program, to execute a game. Thus, a shooting game in which a natural augmented reality effect is realized can be displayed on the upper LCD 22.

Furthermore, the present technology is applicable to any mobile electronic devices (such as PDAs (Personal Digital Assistants) and mobile telephones), personal computers, cameras, and the like as well as to the game apparatus according to the present embodiment.

Further, according to the present embodiment, the virtual object display process based on the flow chart described above is performed by a predetermined program being executed by the information processing section 31 of the game apparatus 10. However, the present invention is not limited thereto. A part or the entirety of the virtual object display process may be performed by a dedicated circuit included in the game apparatus 10.

Moreover, the process described above not only may be performed by one game apparatus (information processing apparatus), but also may be shared and performed by a plurality of information processing apparatuses connected to each other so as to communicate with each other.

Further, in the present embodiment, the correction view matrixes corresponding three blending ratios which are 0.3, 0.7, and 1.0 are used. However, the present invention is not limited thereto. A correction view matrix may be calculated in accordance with a distance between the marker and the virtual object in each cycle, and the correction view matrix having been calculated may be used for rendering the virtual object. In this case, the degree of the correction is gradually increased toward a virtual object which is separated from the marker by a long distance so as to minimize the degree of the correction for a virtual object closest to the marker.

Further, in the present embodiment, when the virtual object is a moving object, if the distance between the virtual object and the marker is small, no correction is made. The present invention is not limited thereto. If, for example, a moving object which irregularly moves is corrected, a user does not feel unnatural. Therefore, the virtual object which irregularly moves and is separated from the marker by a short distance can be corrected in position. A moving object which regularly moves does not follow the movement of the camera, and a user may feel unnatural. However, a moving object which irregularly moves does not cause a user to feel unnatural.

Furthermore, in the present embodiment, a video see-through method in which the virtual objects are superimposed on a camera image photographed by the outer imaging section 23 to display the superimposed image on the upper LCD 22 is described. However, the present invention is not limited thereto. For example, an optical see-through method may be realized. In this case, a head-mounted display including at least a camera is used, and a user can view a real space through a display section corresponding to lenses of glasses. The display section is formed of a material which enables the transmission of the real space, and enables the real space to be transmitted directly to eyes of a user. Further, an image representing virtual objects generated by a computer can be displayed on the display section. Thus, a user can view an image in which images of the virtual objects are superimposed on the real space. The camera included in the head-mounted display is used to detect for the marker disposed in the real space.

While the technology presented herein has been described in detail, the foregoing description is in all aspects illustrative and not restrictive. It is understood that numerous other modifications and variations can be devised without departing from the scope of the present technology.

What is claimed is:

1. A non-transitory computer-readable storage medium having stored therein an information processing program for causing a computer, of an information processing apparatus connected to an imager and a display which displays a real space on a screen in a visible manner, to perform at least:
   sequentially acquiring photographed image data representing a photographed image of a specific target in the real space which is photographed by the imager;
   detecting the specific target in the photographed image represented by the photographed image data which has been sequentially acquired;
   calculating a relative positional relationship between the imager and the specific target in the real space;
   setting a position and an orientation of a virtual camera in a virtual space, based on the positional relationship;
   determining a corrected position and orientation of the virtual camera by correcting a position and an orientation of the virtual camera which have been most recently set, using a position and an orientation of the virtual camera which have been set at a previous time, wherein the amount of correction depends on the distance between the position of the specific target in the virtual space corresponding to the specific target in the real space and the position of the virtual object in the virtual space, or between the position of the virtual camera in the virtual space and the position of the virtual object in the virtual space;
   generating an object image of a virtual object in the virtual space, based on the determined corrected position and orientation of the virtual camera; and
superimposing the generated object image the real space on the screen of the display to perform a display.

2. The non-transitory computer-readable storage medium having stored therein the information processing program according to claim 1, wherein
the corrected position and orientation of the virtual camera is determined such that, when the distance between the position of the specific target in the virtual space corresponding to the specific target in the real space and the position of the virtual object in the virtual space is long, a degree to which the position and the orientation of the virtual camera having been set at the previous time are used is greater than when the distance is short.

3. The non-transitory computer-readable storage medium having stored therein the information processing program according to claim 1, wherein
the object image is generated, based on the position and the orientation of the virtual camera having been most recently set, when the distance between the position of the specific target in the virtual space corresponding to the specific target in the real space and the position of the virtual object in the virtual space is less than a predetermined distance.

4. The non-transitory computer-readable storage medium having stored therein the information processing program according to claim 1, wherein
the corrected position and orientation of the virtual camera is determined, based on the position and the orientation of the virtual camera having been most recently set, and the position and the orientation of the virtual camera having been set at the previous time, when the virtual object is a moving object.

5. The non-transitory computer-readable storage medium having stored therein the information processing program according to of claim 1, wherein
the corrected position and orientation of the virtual camera are obtained by correcting the position and the orientation of the virtual camera having been set at the previous time so as to approach, at a predetermined ratio, the position and the orientation of the virtual camera having been most recently set.

6. The non-transitory computer-readable storage medium having stored therein the information processing program according to claim 5, wherein
the predetermined ratio is less than or equal to a predetermined value.

7. The non-transitory computer-readable storage medium having stored therein the information processing program according to claim 1, wherein
the corrected position and orientation of the virtual camera are determined, by blending, at a predetermined ratio, the position and the orientation of the virtual camera having been set at the previous time, and the position and the orientation of the virtual camera having been most recently set.

8. The non-transitory computer-readable storage medium having stored therein the information processing program according to claim 7, wherein
the computer is caused to further perform holding a plurality of groups each containing the determined position and the orientation of the virtual camera such that the predetermined ratio is different for each group, and the object image is generated based on a selected one of the plurality of groups each containing the position and the orientation of the virtual camera.

9. The non-transitory computer-readable storage medium having stored therein the information processing program according to claim 1, wherein
the corrected position and orientation of the virtual camera is determined so as to satisfy a change allowable value of the position of the virtual camera and a change allowable value of the orientation of the virtual camera.

10. The non-transitory computer-readable storage medium having stored therein the information processing program according to claim 1, wherein
the position and the orientation of the virtual camera are represented by a view matrix.

11. The non-transitory computer-readable storage medium having stored therein the information processing program according to claim 1, wherein
the program causes the computer to further perform positioning a plurality of the virtual objects in the virtual space, and determining the corrected position and orientation of the virtual camera for each virtual object.

12. An information processing apparatus comprising:
an imager for taking an image as a photographed image;
a display for displaying a real space on a screen in a visible manner; and
a computer processor configured to perform at least:
sequentially acquiring photographed image data representing a photographed image of a specific target in the real space which is photographed by the imager;
detecting the specific target in the photographed image represented by the photographed image data which has been sequentially acquired;
calculating a relative positional relationship between the imager and the specific target in the real space;
setting a position and an orientation of a virtual camera in a virtual space, based on the positional relationship;
determining a corrected position and orientation of the virtual camera, by correcting a position and an orientation of the virtual camera which have been most recently set, using a position and an orientation of the virtual camera which have been set at a previous time, wherein
the amount of correction depends on the distance between the position of the specific target in the virtual space corresponding to the specific target in the real space and the position of the virtual object in the virtual space, or between the position of the virtual camera in the virtual space and the position of the virtual object in the virtual space;
generating an object image of a virtual object in the virtual space, based on the determined corrected position and orientation of the virtual camera; and
superimposing the generated object image on the real space on the screen of the display to perform a display.

13. An information processing system comprising:
an imager for taking an image as a photographed image;
a display for displaying a real space on a screen in a visible manner; and
a computer processor configured to perform at least:
sequentially acquiring photographed image data representing a photographed image of a specific target in the real space which is photographed by the imager;
detecting the specific target in the photographed image represented by the photographed image data which has been sequentially acquired;
calculating a relative positional relationship between the imager and the specific target in the real space;
setting a position and an orientation of a virtual camera in a virtual space, based on the positional relationship;
determining a corrected position and orientation of the virtual camera, by correcting a position and an orientation of the virtual camera which have been most recently set, using a position and an orientation of the virtual camera which have been set at a previous time, wherein the amount of correction depends on the distance between the position of the specific target in the virtual space corresponding to the specific target in the real space and the position of the virtual object in the virtual space, or between the position of the virtual camera in the virtual space and the position of the virtual object in the virtual space;

generating an object image of a virtual object in the virtual space, based on the determined corrected position and orientation of the virtual camera; and superimposing the generated object image on the real space on the screen of the display to perform a display.

14. An information processing method comprising:

taking an image of a specific target in the real space as a photographed image by an imager;

displaying a real space on a screen of a display in a visible manner;

sequentially acquiring photographed image data representing a photographed image of the specific target in the real space which is photographed by the imager;

detecting the specific target in the photographed image represented by the photographed image data which has been sequentially acquired;

calculating a relative positional relationship between the imager and the specific target in the real space;

setting a position and an orientation of a virtual camera in a virtual space, based on the positional relationship;

determining a corrected position and orientation of the virtual camera, by correcting a position and an orientation of the virtual camera which have been most recently set, using a position and an orientation of the virtual camera which have been set at a previous time, wherein the amount of correction depends on the distance between the position of the specific target in the virtual space corresponding to the specific target in the real space and the position of the virtual object in the virtual space, or between the position of the virtual camera in the virtual space and the position of the virtual object in the virtual space;

generating an object image of a virtual object in the virtual space, based on the determined corrected position and orientation of the virtual camera; and superimposing the generated object image on the real space on the screen of the display to perform a display.

15. A non-transitory computer-readable storage medium having stored therein an information processing program for causing a computer, of an information processing apparatus connected to an imager and a display which displays a real space on a screen in a visible manner, to perform at least:

sequentially acquiring photographed image data representing a photographed image of a specific target in the real space which is photographed by the imager;

detecting the specific target in the photographed image represented by the photographed image data which has been sequentially acquired;

calculating a relative positional relationship between the imager and the specific target in the real space;

setting a position and an orientation of a virtual camera in a virtual space, based on the positional relationship;

determining a corrected display position of a virtual object, by correcting a display position, of the virtual object which is obtained by taking an image of the virtual object in the virtual space by the virtual camera having the position and the orientation having been most recently set, using a previous display position of the virtual camera, wherein the amount of correction depends on the distance between the position of the specific target in the virtual space corresponding to the specific target in the real space and the position of the virtual object in the virtual space, or between the position of the virtual camera in the virtual space and the position of the virtual object in the virtual space;

generating a virtual object image of the virtual object so as to display the virtual object at the determined corrected display position; and superimposing the generated virtual object image on the real space on the screen of the display to perform a display.

16. The non-transitory computer-readable storage medium having stored therein the information processing program according to claim 15, wherein the corrected position of the virtual object in the virtual space is determined by using a position of the virtual object in the virtual space which is obtained in a most recent process loop, and a position of the virtual object in the virtual space which has been obtained in a process loop preceding the most recent process loop, and the virtual object image is generated by an image of the virtual object located at the latest position in the virtual space being taken by the virtual camera having the position and the orientation having been most recently set.

17. A non-transitory computer-readable storage medium having stored therein an information processing program for causing a computer, of an information processing apparatus connected to an imager and a display which displays a real space on a screen in a visible manner, to perform at least:

sequentially acquiring photographed image data representing a photographed image of a specific target in the real space which is photographed by the imager;

detecting the specific target in the photographed image represented by the photographed image data which has been sequentially acquired;

calculating a relative positional relationship between the imager and the specific target in the real space;

setting a position and an orientation of a virtual camera in a virtual space, based on the positional relationship;

determining a corrected position and orientation of the virtual camera, by correcting a position and an orientation of the virtual camera having been most recently set using a position and an orientation of the virtual camera having been previously used for generating an object image of a virtual object in the virtual space, wherein the amount of correction depends on the distance between the position of the specific target in the virtual space corresponding to the specific target in the real space and the position of the virtual object in the virtual space, or between the position of the virtual camera in the virtual space and the position of the virtual object in the virtual space;

generating the object image, based on the determined corrected position and orientation of the virtual camera; and superimposing the generated object image on the real space on the screen of the display to perform a display.

* * * * *